(12) United States Patent
Katoh et al.

(10) Patent No.: US 7,106,389 B2
(45) Date of Patent: Sep. 12, 2006

(54) OPTICAL SHIFTER AND PROJECTION TYPE OPTICAL DISPLAY SYSTEM

(75) Inventors: Hiromi Katoh, Nara (JP); Takashi Shibatani, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 13 days.

(21) Appl. No.: 10/693,564

(22) Filed: Oct. 27, 2003

(65) Prior Publication Data

US 2004/0085486 A1   May 6, 2004

(30) Foreign Application Priority Data

Oct. 28, 2002   (JP) .............................. 2002-313124

(51) Int. Cl.
*G02F 1/1335* (2006.01)
(52) U.S. Cl. ................. 349/8; 349/5; 349/74
(58) Field of Classification Search ................ 349/5–9, 349/181, 74
See application file for complete search history.

(56) References Cited

U.S. PATENT DOCUMENTS

| | | | |
|---|---|---|---|
| 5,161,042 A | 11/1992 | Hamada | |
| 5,506,701 A | 4/1996 | Ichikawa | |
| 5,715,029 A * | 2/1998 | Fergason | .................... 349/196 |
| 5,969,832 A | 10/1999 | Nakanishi et al. | |
| 6,061,103 A * | 5/2000 | Okamura et al. | ........... 348/767 |
| 2002/0047105 A1* | 4/2002 | Tarumi et al. | ......... 252/299.63 |
| 2003/0090597 A1 | 5/2003 | Katoh et al. | |

FOREIGN PATENT DOCUMENTS

| | | |
|---|---|---|
| JP | 59-230383 A | 12/1984 |
| JP | 5-249318 A | 9/1993 |

* cited by examiner

*Primary Examiner*—Andrew Schechter
*Assistant Examiner*—Phu Vu
(74) *Attorney, Agent, or Firm*—Birch, Stewart, Kolasch & Birch, LLP

(57) ABSTRACT

An optical shifter includes first and second optical shifting sections, each of which can transmit an incoming light ray after having shifted its optical axis and which are arranged such that a light ray transmitted through the first optical shifting section enters the second optical shifting section. Each of the shifting sections includes: a liquid crystal element including a liquid crystal cell, which selectively changes the polarization direction of the incoming light ray responsive to a voltage applied thereto; and a birefringent element, which receives the light ray transmitted through the liquid crystal element and which exhibits one of different refractive indices according to the polarization direction of the incoming light ray. The magnitude of shift caused by the first optical shifting section between the optical axes of the incoming and outgoing light rays is substantially twice greater than that of shift caused by the second optical shifting section.

24 Claims, 18 Drawing Sheets

OPTICAL SHIFTER AND PROJECTION TYPE OPTICAL DISPLAY SYSTEM

BACKGROUND OF THE INVENTION

1. Field of the Invention

The present invention relates to an optical shifter that can be used to physically shift, or displace, the optical axis of outgoing light such that an optical output signal being presented on the screen moves to another location in a head mounted display (HMD) or a projection type optical display system (i.e., projector) and also relates to a method for driving such an optical shifter. The present invention further relates to a projection type optical display system including such an optical shifter.

2. Description of the Related Art

A projection type optical display system that uses a liquid crystal display (LCD) panel is known as an optical display system. Such a projection type optical display system needs to be separately provided with a light source because the LCD panel itself emits no light. However, the projection type optical display system using an LCD panel is advantageous over a projection type optical display system using a CRT, because the display system of the former type realizes a broader color reproducible range, has a smaller size and a lighter weight, and needs no convergence correction.

A projection type optical display system may conduct a full-color display operation either by a three-panel method (i.e., with three LCD panels used for the three primary colors) or by a single-panel method (i.e., with just one LCD panel used).

A three-panel projection type optical display system uses an optical system for splitting white light into three light rays representing the three primary colors of red (R), green (G) and blue (B) and three LCD panels for modulating the R, G and B light rays and thereby forming three image components. By optically superimposing the R, G and B image components one upon the other, the three-panel projection type optical display system can create an image in full colors.

The three-panel projection type optical display system can efficiently utilize the light that is radiated from a white light source but needs a complicated optical system and a greater number of components. Thus, the three-panel projection type optical display system is normally less advantageous than the single-panel projection type optical display system in respects of cost and size.

The single-panel projection type optical display system uses a single LCD panel including multiple R, G and B color filters that are arranged in a mosaic or striped pattern, and gets a full-color image, displayed on the LCD panel, projected onto a projection plane (e.g., a screen) by a projection optical system. Such a single-panel projection type optical display system is described in Japanese Laid-Open Publication No. 59-230383, for example. The single-panel type uses only one LCD panel, and needs an optical system that is much simpler than that of the three-panel type. Thus, the single-panel method can be used effectively to provide a small-sized projection type optical display system at a reduced cost.

In the single-panel type that uses color filters, however, light is absorbed into the color filters. Accordingly, compared to a three-panel type that uses a similar light source, the brightness of the image decreases to about one-third in the single-panel type. In addition, one pixel should be displayed by a set of three pixel regions of the LCD panel that correspond to R, G and B, respectively. Thus, the resolution of the image also decreases to one-third as compared to the three-panel type.

One of possible measures against that decrease in brightness is using a brighter light source. However, the use of a light source with great power dissipation for a consumer electronic appliance is not preferred. Also, when color filters of absorption type are used, the light that has been absorbed into the color filters changes into heat. Accordingly, if the brightness of the light source is increased excessively, then not only the temperature of the LCD panel increases but also the discoloration of the color filters is accelerated. For that reason, to increase the utility value of the projection type optical display system, it is very important how to make full use of the given light.

To increase the brightness of an image displayed by a single-panel projection type optical display system, a liquid crystal display device for conducting a display operation in full colors without using any color filter was developed and disclosed in Japanese Laid-Open Publication No. 4-60538, for example. In this liquid crystal display device, the white light that has been radiated from a light source is split into R, G and B light rays by dielectric mirrors such as dichroic mirrors. The light rays are then incident onto a microlens array at mutually different angles. The microlens array is provided on one side of an LCD panel so as to face the light source. These light rays that have been incident onto a microlens are transmitted through the microlens so as to be focused onto their associated pixel regions in accordance with the respective angles of incidence. Thus, the R, G and B split light rays are modulated by mutually different pixel regions and then used for a full-color display.

A display system, which uses transmissive hologram elements for the R, G and B light rays instead of the dielectric mirrors to utilize the light as efficiently as possible, is disclosed in Japanese Laid-Open Publication No. 5-249318. On the other hand, a display system, which includes a transmissive hologram element having a periodic structure defined by a pixel pitch and functioning as the dielectric mirrors or microlenses, is disclosed in Japanese Laid-Open Publication No. 6-222361.

The low resolution is another problem of the single-panel type. As for this problem, however, by adopting a field sequential technique, even just one LCD panel can achieve a resolution comparable to that of the three-panel type. The field sequential technique utilizes the phenomenon that when the colors of a light source are switched at too high a rate to be sensed by the human eyes, respective image components to be displayed time-sequentially have their colors mixed together by an additive color mixture process. This phenomenon is called a "continuous additive color mixture process".

A projection type optical display system for conducting a full-color display operation by the field sequential technique may have a configuration such as that shown in FIG. 28, for example. In this optical display system, a disk, made up of R, G and B color filters, is rotated at a high velocity that corresponds to one vertical scan period of an LCD panel, and image signals, representing the colors of the three color filters, are sequentially input to the driver circuit of the LCD panel. In this manner, a synthesized image of three image components corresponding to the respective colors is recognized by human eyes.

In the display system of such a field sequential type, the R, G and B image components are displayed time-sequentially by each pixel of the LCD panel unlike the single-panel type. Thus, the resolution thereof is comparable to that of the three-panel type.

A projection type optical display system that irradiates mutually different regions of an LCD panel with the R, G and B light rays is disclosed as another display system of the field sequential type in Proc. International Display Workshop 1999 (IDW '99), December 1999, pp. 989–992. In this display system, the white light that has been radiated from a light source is split by dielectric mirrors into R, G and B light rays, which will be then focused onto mutually different regions of the LCD panel. The portions of the LCD panel to be irradiated with the R, G and B light rays are sequentially switched by rotating a cubic prism.

However, the display systems disclosed in Japanese Laid-Open Publications Nos. 4-60538, 5-249318 and 6-222361 identified above can increase the brightness but the resolution thereof remains one-third of that of the three-panel type. The reason is that three spatially separated R, G and B pixels are used as a set to represent one pixel (or dot).

In contrast, the normal field-sequential type can increase the resolution to a level comparable to that of the three-panel type. However, the brightness of the image achieved by the normal field-sequential type is no more satisfactory than the conventional single-panel type because the field-sequential type uses color filters.

In the display system disclosed in IDW '99 on the other hand, the points of incidence of the R, G and B light rays should not overlap with each other. For that purpose, illuminated light having a very high degree of parallelism is needed. Accordingly, the optical efficiency also decreases as being constrained by the degree of parallelism of the illuminated light.

Thus, none of the conventional techniques described above can increase the brightness and the resolution at the same time or solve the problems of the single-panel type.

To overcome these problems, the applicant of the present application proposed improved single-panel projection type optical display systems in Japanese Laid-Open Publication No. 9-214997 and in pamphlet of PCT International Publication No. WO 01/96932.

The projection type optical display system as disclosed in Japanese Laid-Open Publication No. 9-214997 uses a liquid crystal display device similar to that disclosed in Japanese Laid-Open Publication No. 4-60538 identified above. The display system also splits the white light into light rays in respective colors and then makes these light rays incident onto their associated pixel regions at mutually different angles by similar methods. To increase the optical efficiency and the resolution at the same time, this projection type optical display system divides each image frame into multiple image subframes time-sequentially and periodically switches the angles of incidence of the light rays every time one vertical scan period of the LCD panel passes.

In the projection type optical display system disclosed in PCT International Publication No. WO 01/96932, the white light is split by dichroic mirrors into R, G and B light rays, which are then incident at mutually different angles onto their associated pixel regions of the same LCD panel through a microlens array. Also, data representing a plurality of image subframes are generated from data representing each image frame as an image component. Then, the image subframes are displayed on the LCD panel time-sequentially. Thereafter, by sequentially shifting these image subframes on a projection plane, the same area on the projection plane is sequentially irradiated with multiple light rays that have been modulated by mutually different pixel regions of the LCD panel and that fall within respectively different wavelength ranges (which will be referred to herein as "R, G and B light rays").

These projection type optical display systems use no color filters, thus achieving high optical efficiency and displaying an image at a high resolution.

In the optical display system disclosed in PCT International Publication No. WO 01/96932, however, a plurality of image subframes, generated from data representing each image frame as an image component, needs to be sequentially shifted on the projection plane. These image subframes are generated for the purpose of displaying an image frame time-sequentially. Accordingly, the interval at which the image subframes are sequentially shifted on the projection plane needs to be much shorter than one period of the image frame.

Also, in the optical display system disclosed in PCT International Publication No. WO 01/96932, this image shifting is carried out by an optical shifter that includes a birefringent element, which changes its refractive index depending on the polarization direction of incoming light, and a polarization direction switching element, which switches the polarization directions of the light to be incident onto the birefringent element. In that case, unless the polarization directions are switched by the polarization direction switching element almost completely synchronously with the switch of image components to be displayed, pixels not be to displayed may be presented. Then, the resolution will decrease, and an unwanted periodic dotted pattern will appear on the projection plane, thus deteriorating the quality of the image projected. Accordingly, in such an optical display system, the polarization directions must be switched at a particularly high response speed.

SUMMARY OF THE INVENTION

In order to overcome the problems described above, preferred embodiments of the present invention provide an optical shifter that operates at a sufficiently high response speed, a method for driving such an optical shifter, and a projection type optical display system, which realizes the display of a bright, high-resolution and uniform image of quality by using such an optical shifter and which can effectively contribute to cutting down the overall size and cost of the optical display systems.

An optical shifter according to a preferred embodiment of the present invention preferably includes a first optical shifting section and a second optical shifting section. Each of the first and second optical shifting sections is preferably able to transmit an incoming light ray after having shifted the optical axis thereof. The first and second optical shifting sections are preferably arranged such that a light ray that has been transmitted through the first optical shifting section enters the second optical shifting section. Each of the first and second optical shifting sections preferably includes: a liquid crystal element including a liquid crystal cell, which selectively changes the polarization direction of the incoming light ray in response to a voltage applied thereto; and a birefringent element, which receives the light ray that has been transmitted through the liquid crystal element and which exhibits one of multiple different refractive indices according to the polarization direction of the incoming light ray. The magnitude of shift caused by the first optical shifting section between the optical axes of the incoming and outgoing light rays thereof is preferably substantially twice greater than that of shift caused by the second optical shifting section between the optical axes of the incoming and outgoing light rays thereof.

In one preferred embodiment of the present invention, the optic axis of the birefringent element included in the first optical shifting section is preferably parallel to that of the birefringent element included in the second optical shifting section.

An optical shifter according to another preferred embodiment of the present invention preferably includes a first optical shifting section and a second optical shifting section. Each of the first and second optical shifting sections is preferably able to transmit an incoming light ray after having shifted the optical axis thereof. The first and second optical shifting sections are preferably arranged such that a light ray that has been transmitted through the first optical shifting section enters the second optical shifting section. Each of the first and second optical shifting sections preferably includes: a liquid crystal element including a first liquid crystal cell and a second liquid crystal cell, each of which selectively changes the polarization direction of the incoming light ray in response to a voltage applied thereto; and a birefringent element, which receives the light ray that has been transmitted through the liquid crystal element and which exhibits one of multiple different refractive indices according to the polarization direction of the incoming light ray. The magnitude of shift caused by the first optical shifting section between the optical axes of the incoming and outgoing light rays thereof is preferably substantially equal to that of shift caused by the second optical shifting section between the optical axes of the incoming and outgoing light rays thereof. The optic axis of the birefringent element included in the first optical shifting section is preferably parallel to that of the birefringent element included in the second optical shifting section.

An optical shifter according to still another preferred embodiment of the present invention preferably includes a first optical shifting section and a second optical shifting section. Each of the first and second optical shifting sections is preferably able to transmit an incoming light ray after having shifted the optical axis thereof. The first and second optical shifting sections are preferably arranged such that a light ray that has been transmitted through the first optical shifting section enters the second optical shifting section. Each of the first and second optical shifting sections preferably includes: a liquid crystal element including a first liquid crystal cell and a second liquid crystal cell, each of which selectively changes the polarization direction of the incoming light ray in response to a voltage applied thereto; and a birefringent element, which receives the light ray that has been transmitted through the liquid crystal element and which exhibits one of multiple different refractive indices according to the polarization direction of the incoming light ray. The ratio of the magnitude of shift caused by the first optical shifting section between the optical axes of the incoming and outgoing light rays thereof to that of shift caused by the second optical shifting section between the optical axes of the incoming and outgoing light rays thereof is preferably substantially equal to either two to one or one to two. The optic axis of the birefringent element included in the first optical shifting section and that of the birefringent element included in the second optical shifting section are preferably defined on the same plane but are preferably tilted toward mutually opposite directions from the optical axis of the incoming light ray.

In one preferred embodiment of the present invention, the magnitude of shift caused by the first optical shifting section between the optical axes of the incoming and outgoing light rays thereof is preferably substantially twice greater than that of shift caused by the second optical shifting section between the optical axes of the incoming and outgoing light rays thereof.

In another preferred embodiment, the optical axis of the outgoing light ray of the second optical shifting section is preferably defined by one of first, second and third positions according to a combination of voltages to be applied to the liquid crystal elements of the first and second optical shifting sections. The first position is preferably aligned with the optical axis of the incoming light ray of the first optical shifting section. The second position has preferably been shifted by $\Delta d$ from the optical axis of the incoming light ray of the first optical shifting section. The third position has preferably been shifted by $2\Delta d$ from the optical axis of the incoming light ray of the first optical shifting section.

In still another preferred embodiment, the optical axis of the outgoing light ray of the second optical shifting section is preferably defined by one of first, second, third and fourth positions according to a combination of voltages to be applied to the liquid crystal elements of the first and second optical shifting sections. The first position is preferably aligned with the optical axis of the incoming light ray of the first optical shifting section. The second position has preferably been shifted by $\Delta d$ from the optical axis of the incoming light ray of the first optical shifting section. The third position has preferably been shifted by $2\Delta d$ from the optical axis of the incoming light ray of the first optical shifting section. The fourth position has preferably been shifted by $3\Delta d$ from the optical axis of the incoming light ray of the first optical shifting section.

In yet another preferred embodiment, the liquid crystal cell is preferably a TN mode liquid crystal cell exhibiting positive dielectric anisotropy $\Delta \in$ and the birefringent element is preferably a quartz plate of uniaxial crystals.

In yet another preferred embodiment, the first and second liquid crystal cells are preferably TN mode liquid crystal cells, exhibiting positive dielectric anisotropy $\Delta \in$ and having opposite optical rotatory directions, and are preferably arranged such that directors cross each other at right angles on a pair of planes of the first and second liquid crystal cells that are opposed to each other. The birefringent element is preferably a quartz plate of uniaxial crystals.

In a method for driving the optical shifter according to a preferred embodiment of the present invention, the optical axis of the outgoing light ray of the second optical shifting section preferably repeatedly shifts from one of the first, second and third positions to the next in this order. The method preferably includes the step of regulating the voltages to be applied to the liquid crystal cells of the first and second optical shifting sections such that the voltages being applied to the liquid crystal cells of the first and second optical shifting sections are not suspended simultaneously whenever the optical axis of the light ray shifts from one of the three positions to the next.

In a method for driving the optical shifter according to another preferred embodiment of the present invention, the optical axis of the outgoing light ray of the second optical shifting section preferably repeatedly shifts in the order of the first, second, third, first, third and second positions. The method preferably includes the step of regulating the voltages to be applied to the liquid crystal cells of the first and second optical shifting sections such that the voltages being applied to the liquid crystal cells of the first and second optical shifting sections are suspended simultaneously the smallest number of times when the optical axis of the light ray shifts from one of the three positions to the next.

In a method for driving the optical shifter according to still another preferred embodiment of the present invention, the optical axis of the outgoing light ray of the second optical shifting section preferably repeatedly shifts from one of the first, second, third and fourth positions to the next in this order. The method preferably includes the step of regulating the voltages to be applied to the liquid crystal cells of the first and second optical shifting sections such that the voltages being applied to the liquid crystal cells of the first and second optical shifting sections are not suspended simultaneously whenever the optical axis of the light ray shifts from one of the four positions to the next.

In a method for driving the optical shifter according to yet another preferred embodiment of the present invention, the optical axis of the outgoing light ray of the second optical shifting section preferably repeatedly shifts from one of the first, second and third positions to the next in this order. The method preferably includes the step of regulating the voltages to be applied to the first and second liquid crystal cells of the first and second optical shifting sections such that a period of time in which no voltages are applied to the first or second liquid crystal cells of the first and second optical shifting sections is longer than a period of time in which one of the three positions is being selected.

A projection type optical display system according to a preferred embodiment of the present invention preferably includes a light source, a display panel, a light control system, an optical system, a circuit, and the optical shifter according to any of the preferred embodiments of the present invention described above. The display panel preferably includes multiple pixel regions, each of which is able to modulate light. The light control system preferably splits the light, which has been emitted from the light source, into light rays falling within a number of wavelength ranges and preferably focuses the split light rays onto associated ones of the pixel regions according to the wavelength ranges thereof. The optical system preferably forms an image on a projection plane by utilizing the light that has been modulated by the display panel. The circuit preferably generates data representing multiple image subframes from data representing each image frame as a component of the image and preferably gets the image subframes displayed by the display panel time-sequentially. The optical shifter preferably shifts, on the projection plane, a selected one of the multiple image subframes being displayed by the display panel.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
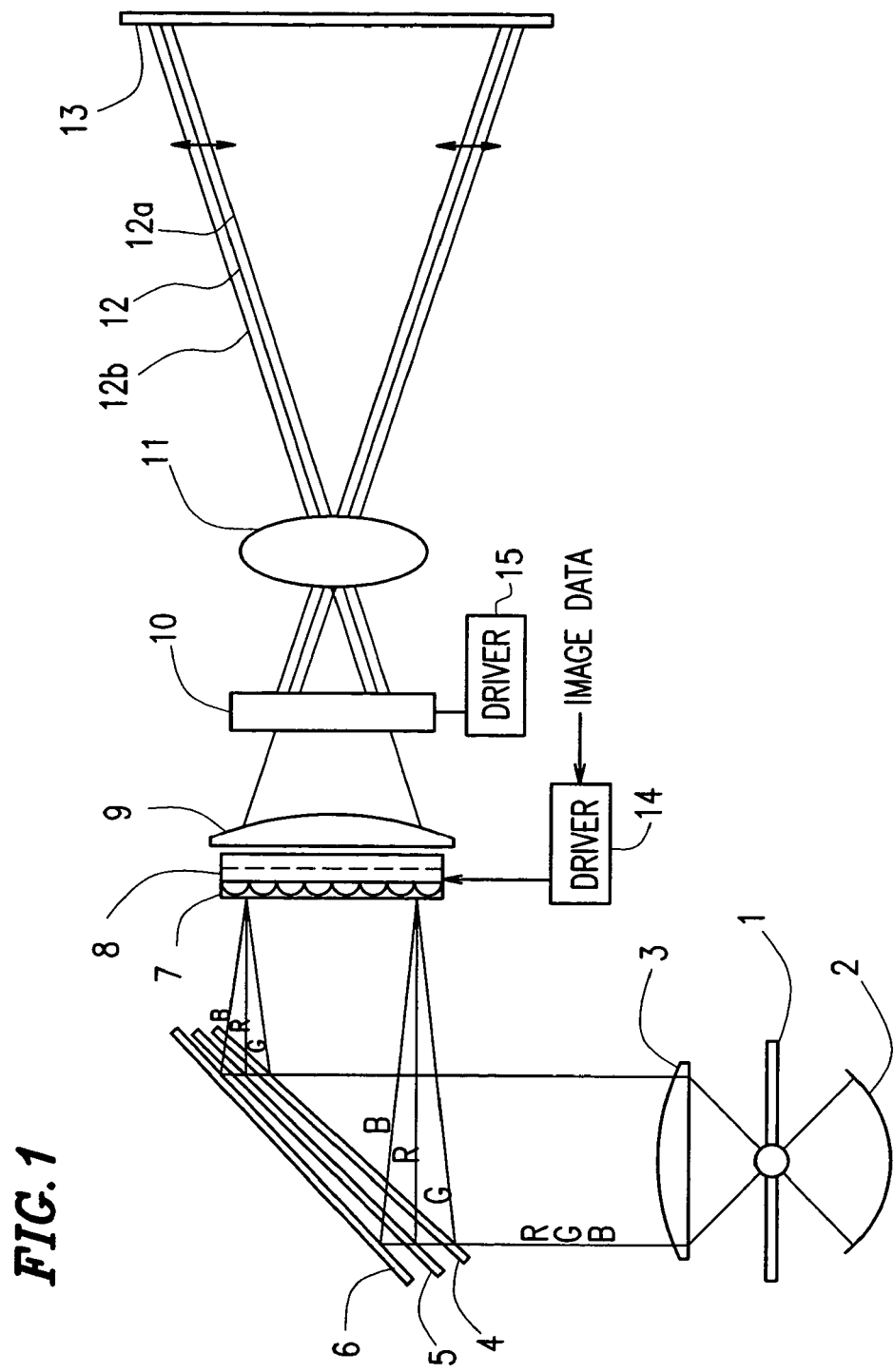
FIG. 1 is a schematic representation illustrating a projection type optical display system according to a preferred embodiment of the present invention.

In a projection type optical display system including an optical shifter according to a preferred embodiment of the present invention, white light that has been emitted from a light source is split by a light control system such as dichroic mirrors into three light rays that fall within three wavelength ranges representing the three primary colors of red (R), green (G) and blue (B), respectively, as disclosed in pamphlet of PCT International Publication No. WO 01/96932. The split R, G and B light rays are then focused by a microlens array onto mutually different pixel regions of a display panel. In this case, the light ray entering each of those pixel regions does not change its colors with time.

On the display panel, data representing multiple image subframes, generated from data representing each image frame as an image component, are presented time sequentially. For example, each image frame may be divided into three image subframes, which are presented on the display panel so as to be shifted from each other by one pixel. In this case, one of multiple pixels, which make up one complete image frame, is associated with one of the pixel regions of the display panel, which is exposed to the R, G or B light ray.

The R, G and B light rays that entered the display panel at mutually different angles leave the display panel at respectively different angles again. The outgoing R, G and B light rays have been modulated by the display panel with the image subframe data and now represent those image subframes by themselves.

Then, a selected one of the image subframes is shifted by an optical shifter and presented on the projection plane. In a preferred embodiment of the present invention, the optical shifter preferably includes a birefringent element, which exhibits one of multiple different refractive indices according to the polarization direction of an incoming light ray, and a polarization direction switching element, which changes the polarization direction of the light ray that is going to enter the birefringent element.

A TN mode liquid crystal display panel to be used as the polarization direction switching element should switch the polarization directions at a sufficiently high speed and should not have its polarization direction switching affected by the wavelength.

In a TN mode liquid crystal layer, however, the liquid crystal molecules normally change their orientation directions quickly enough upon the application of a voltage thereto, but recover their previous state only slowly after the applied voltage has been removed. That is to say, the response speed of the liquid crystal material that is going to be turned ON with the voltage applied is sufficiently high, but that of the liquid crystal material that is going to be turned OFF with the applied voltage removed is low. For that reason, once the voltage that has been applied to the polarization direction switching element of the optical shifter is stopped, switching of the polarization directions and shifting of the image both slow down significantly. As a result, the image may be displayed at an unexpected position and the resolution may decrease.

Also, when the TN mode liquid crystal layer is in normally white state, the incoming light ray with a predetermined wavelength has its plane of polarization rotated 90 degrees by the liquid crystal molecules. However, as the difference between the actual and expected wavelengths of the incoming light ray widens, it becomes more and more difficult to rotate the plane of polarization of the incoming light ray exactly 90 degrees, thus producing some portions with an incompletely changed polarization direction. For example, if a TN mode liquid crystal display panel is designed for a G light ray with a wavelength of 550 nm, then R and B light rays may be presented on pixels at unexpected positions, thus possibly decreasing the resolution and deteriorating the image quality with an unwanted dotted pattern.

Thus, preferred embodiments of the present invention provide an optical shifter that can switch the polarization directions in a sufficiently short time with the wavelength dependence of the polarization direction minimized. The present invention is not limited to a projection type optical display system but is also effectively applicable for use in a direct viewing type optical display system such as viewer or head mounted display. In the following description, however, preferred embodiments of the present invention will be described as being applied to such a projection type optical display system.

Hereinafter, an exemplary arrangement for a projection type optical display system, including an optical shifter according to a specific preferred embodiment of the present invention, will be described with reference to FIGS. 1, 2 and 3.

The projection type optical display system of this preferred embodiment includes a light source 1, an LCD panel 8, a light control system and a projection optical system. The light control system is provided to focus the light, emitted from the light source 1, onto associated pixel regions of the LCD panel 8 in accordance with the wavelength ranges thereof. The projection optical system is arranged so as to project the light rays, which have been modulated by the LCD panel 8, onto a projection plane.

The light control system includes a spherical mirror 2, a condenser lens 3 and dichroic mirrors 4, 5 and 6. The spherical mirror 2 reflects the (white) light, which has been emitted backward from the light source 1, forward. The condenser lens 3 collimates the light, which has come from the light source 1 and the spherical mirror 2, into a parallel light beam. Then, the light beam is split by the dichroic mirrors 4, 5 and 6 into a plurality of light rays according to the wavelength ranges thereof. The light rays that have been reflected by the dichroic mirrors 4, 5 and 6 are then incident onto a microlens array 7 at mutually different angles in accordance with their wavelength ranges. The microlens array 7 is bonded to one of the two substrates of the LCD panel 8 so as to face the light source 1. The light rays, which have been incident onto the microlens array 7 at their respective angles, will be focused on their associated pixel regions that are located at mutually different positions.

In this projection type optical display system, the projection optical system includes a field lens 9 and a projection lens 11 to project the light beam 12, which has been transmitted through the LCD panel 8, onto a screen (i.e., the projection plane) 13. In this preferred embodiment, an optical shifter 10 is provided between the field lens 9 and the projection lens 11. FIG. 1 illustrates light beams 12a and 12b that have been shifted parallel to the projection plane by the optical shifter 10. To get these light beams shifted, however, the optical shifter 10 may be located anywhere between the LCD panel 8 and the screen 13. For example, the optical shifter 10 may also be provided between the projection lens 11 and the screen 13.

Next, the respective members of this projection type optical display system will be described one by one.

In this preferred embodiment, a metal halide lamp having an optical output power of 150 W, an arc length of 5 mm and an arc diameter of 2.2 mm is used as the light source 1 and is arranged such that the arc length direction thereof is parallel to the paper sheet. Examples of other preferred light sources 1 include a halogen lamp, an extra-high voltage mercury lamp and a xenon lamp. The light source 1 for use in this preferred embodiment radiates white light including light rays that fall within three wavelength ranges for the three primary colors.

The spherical mirror 2 is disposed behind the light source 1. The condenser lens 3, having an aperture of 80 mm$\phi$ and a focal length of 60 mm, is provided in front of the light source 1. The spherical mirror 2 is arranged so as to have its center aligned with the center of the emitting portion of the light source 1, while the condenser lens 3 is arranged so as to have its focal point aligned with the center of the light source 1.

In this arrangement, the light emitted from the light source 1 is collimated by the condenser lens 3 so that the LCD panel 8 is illuminated with the collimated light. The degree of parallelism of the light that has passed through the condenser lens 3 may be about 2.2 degrees in the arc length direction (i.e., the direction parallel to the paper of FIG. 1) and about 1 degree in the arc diameter direction.

The LCD panel 8 for use in this preferred embodiment is a transmission type liquid crystal display in which the microlens array 7 is provided on one of two transparent substrates thereof so as to face the light source. Any liquid crystal material or any operation mode may be selected but anyway the LCD panel 8 preferably operates at a sufficiently high speed. In this preferred embodiment, the panel 8 operates in a twisted nematic (TN) mode. The LCD panel 8 includes a plurality of pixel regions for modulating the incoming light. As used herein, the "pixel regions" refer to respective light modulating portions of the display panel that are spatially separated from each other. In this LCD panel 8, a voltage is applied from a pixel electrode, associated with one of those pixel regions, to an associated portion of the liquid crystal layer, thereby changing the optical properties of that portion and modulating the light.

In this LCD panel 8, 768(H)×1,024 (V) scan lines may be driven by a noninterlaced scanning technique. The pixel regions of the LCD panel 8 are arranged two-dimensionally on the transparent substrates. In this preferred embodiment, the pitch of the pixel regions preferably measures 26 μm both horizontally and vertically. FIG. 2 illustrates a portion of the LCD panel 8 shown in FIG. 1 and its surrounding portion on a larger scale. As shown in FIG. 2, in this preferred embodiment, the R, G and B pixel regions 8R, 8G and 8B are arranged so as to define a striped pattern in the horizontal direction of the screen (i.e., in the direction coming out of the paper), and each of the microlenses 7a is allocated to one of multiple sets of three pixel regions (i.e., the R, G and B pixel regions 8R, 8G and 8B).

Figure 2:
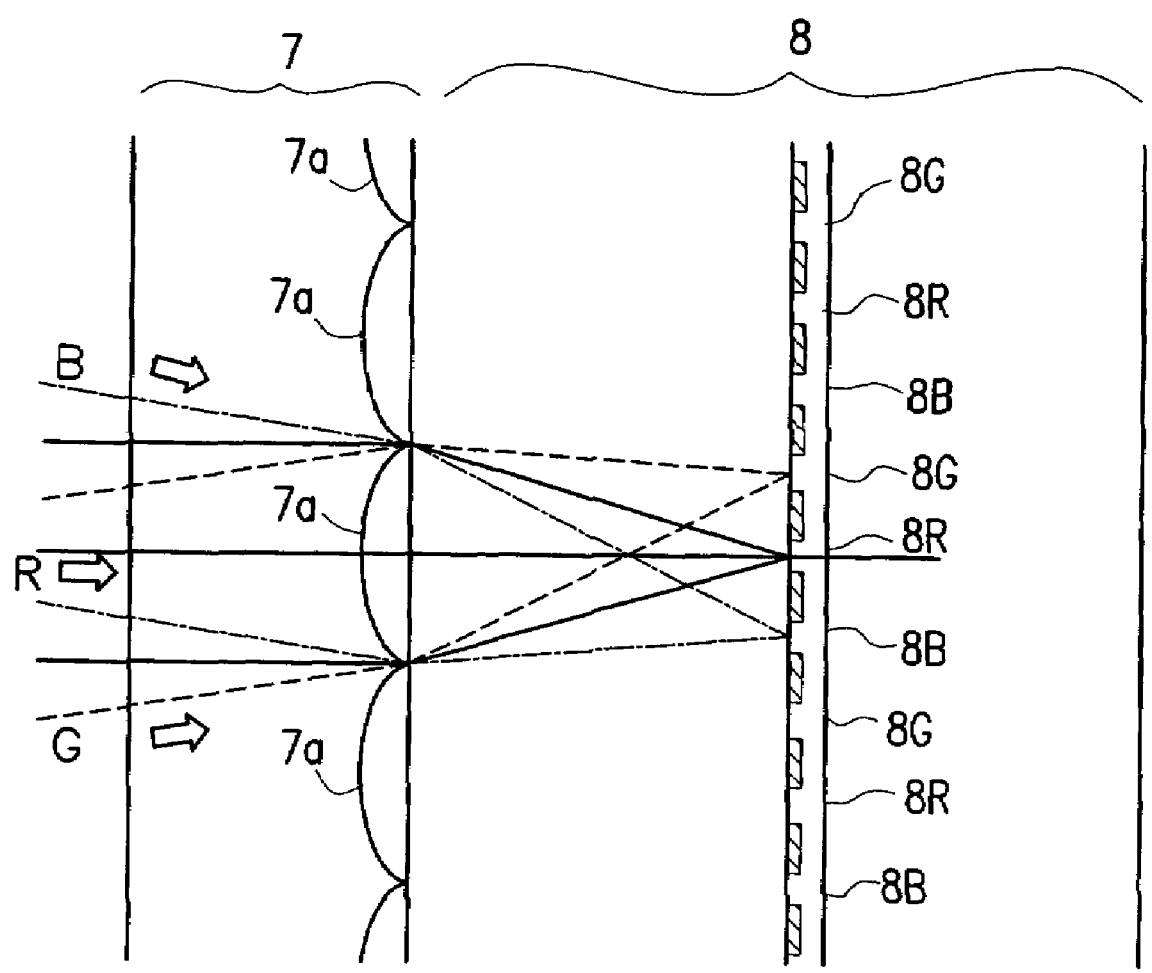
FIG. 2 is a cross-sectional view illustrating, on a larger scale, a portion of the LCD panel and its surrounding portion of the projection type optical display system shown in FIG. 1.

In the preferred embodiment illustrated in FIG. 2, the R, G and B pixel regions 8R, 8G and 8B are arranged so as to define a striped pattern in the horizontal direction of the screen (i.e., in the direction coming out of the paper). Alternatively, the R, G and B pixel regions 8R, 8G and 8B may also be arranged in a mosaic pattern as long as each of the microlenses 7a is allocated to one of multiple sets of three pixel regions (i.e., the R, G and B pixel regions 8R, 8G and 8B).

As shown in FIG. 1, the R, G and B light rays, impinging on the LCD panel 8, have been produced by getting the white light, radiated from the light source 1, split by the dichroic mirrors 4, 5 and 6. The R, G and B light rays are incident onto the microlens array 7 on the LCD panel 8 at mutually different angles. Accordingly, by appropriately setting the angles of incidence of the R, G and B light rays, these light rays may be distributed through one of the microlenses 7a to respective pixel regions corresponding to the three wavelength ranges as shown in FIG. 2. In this preferred embodiment, the microlenses 7a have a focal length of 120 μm so that an angle of 10.02 degrees is formed between two of these three light rays. More specifically, the R light ray is incident perpendicularly onto the LCD panel 8, while each of the B and G light rays is incident thereon so as to define an angle of 10.02 degrees with the R light ray.

Figure 3:
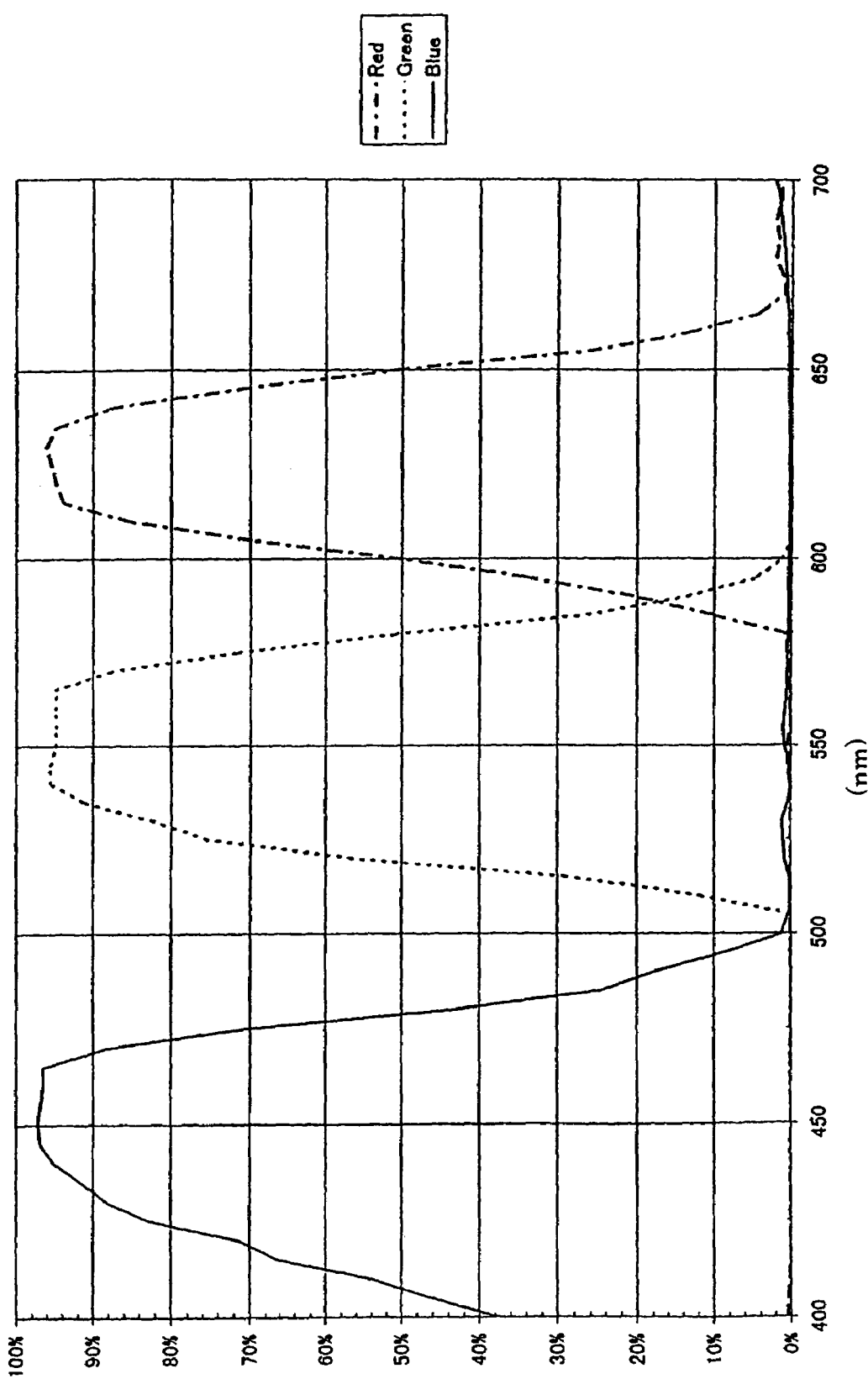
FIG. 3 is a graph showing the spectral characteristics of the dichroic mirrors of the projection type optical display system shown in FIG. 1.

The dichroic mirrors 4, 5 and 6 may have spectral characteristics such as those shown in FIG. 3 and selectively reflect the green (G), red (R) and blue (B) light rays, respectively. The G light ray has a wavelength falling within the range of 520 nm to 580 nm, the R light ray has a wavelength falling within the range of 600 nm to 650 nm, and the B light ray has a wavelength falling within the range of 420 nm to 480 nm.

In this preferred embodiment, the dichroic mirrors 4, 5 and 6 and the microlens array 7 are used to focus the light rays representing the three primary colors onto the respective pixel regions. Alternatively, any other optical element (e.g., a transmission type hologram having diffraction and spectral functions) may also be used.

As described above, the LCD panel 8 is driven by a noninterlaced scanning technique. Accordingly, the panel 8 displays 60 image frames per second. Thus, the time allotted to each frame (i.e., a frame time period T) is $\frac{1}{60}$ second. That is to say, T=$\frac{1}{60}$ second≈16.6 milliseconds. It should be noted that if the panel 8 is driven by an interlaced scanning technique, the scan lines on the screen are grouped into even-numbered lines and odd-numbered lines. In the interlaced scanning, either all of these even-numbered scan lines or all of these odd-numbered scan lines are alternately activated. Accordingly, T=$\frac{1}{30}$ second≈33.3 milliseconds. Also, the time allotted to each of the even- and odd-numbered fields that make up one frame (i.e., one field time period) is $\frac{1}{60}$ second≈16.6 milliseconds.

The projection type optical display system of this preferred embodiment includes an LCD panel driver 14. The LCD panel driver 14 receives image data, including information (or data) about the respective image frames that make up one complete image, and sequentially stores the data on frame memories. In accordance with the information that has been selectively read out from the frame memories, the LCD panel driver 14 generates multiple image subframes one after another and then gets those image subframes displayed on the LCD panel 8 time-sequentially. Hereinafter, it will be described in detail exactly how the LCD panel driver 14 produces the image subframes.

Figure 4:
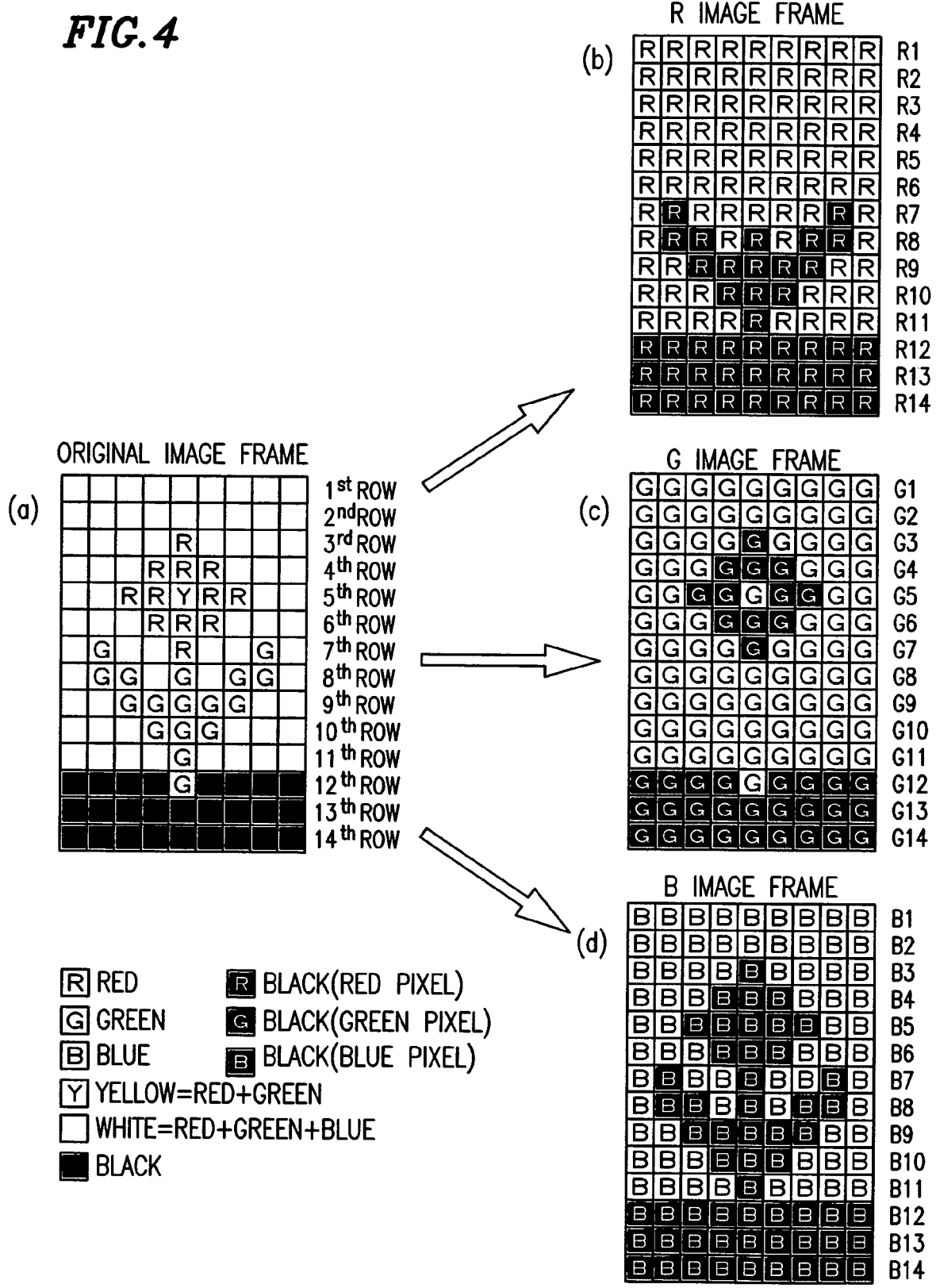
FIG. 4 shows how to produce color-by-color image frames from an original image frame.

For example, suppose an image represented by a frame (i.e., an image frame) is as shown in portion (a) of FIG. 4. This image frame should be displayed in full colors, and the colors of the respective pixels are determined in accordance with the data defining this image frame. It should be noted that in the interlaced scanning technique, an image represented by a field may be processed similarly to an "image frame" as used herein.

First, the color display frame data shown in portion (a) of FIG. 4 is separated into three data subsets corresponding to the R, G and B light rays for the respective pixels, thereby generating three data subsets representing the R, G and B image frames as shown in portions (b), (c) and (d) of FIG. 4. Then, these data subsets are stored on the R, G and B frame memories as shown on the left-hand side of FIG. 5.

Figure 5:
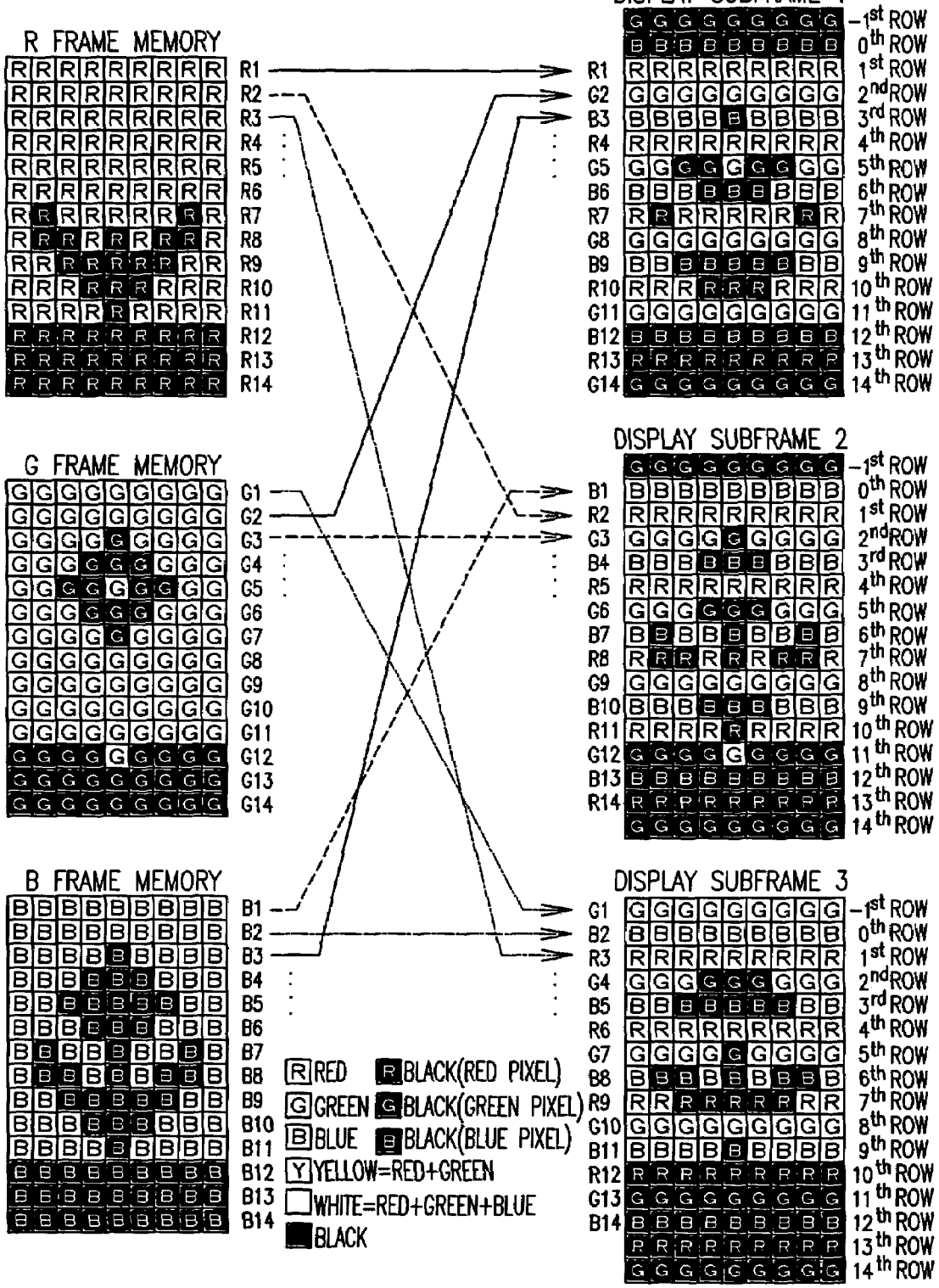
FIG. 5 shows how to generate three subframe data from color-by-color image frame data.
Figure 6:
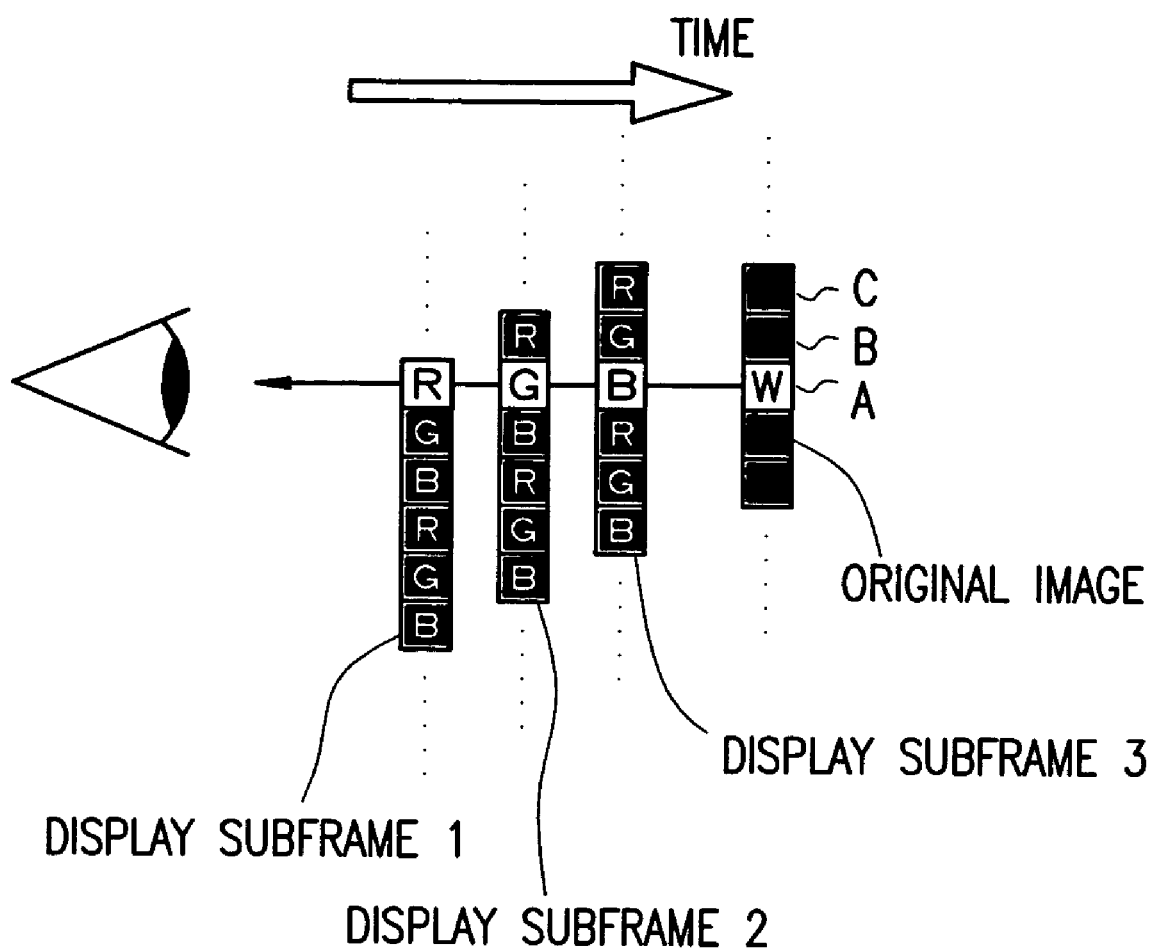
FIG. 6 shows a mode to shift display subframes.

On the other hand, the right-hand side of FIG. 5 shows display subframes Nos. 1, 2 and 3. In this preferred embodiment, an image represented by a display subframe No. 1 is displayed on the projection plane during the first one-third of a frame period (i.e., a first subframe period). During the next one-third (i.e., second subframe period), an image represented by a display subframe No. 2 is displayed. And during the last one-third (i.e., third subframe period), an image represented by a display subframe No. 3 is displayed. In this preferred embodiment, these three image subframes are displayed while being shifted from each other as shown in FIG. 6 and are combined together time sequentially. As a result, an original image such as that shown in portion (a) of FIG. 4 is sensed by the viewer's eyes.

Next, it will be described in detail how the data are arranged in an image subframe by taking display subframe No. 1 as an example. As shown in FIG. 5, the data representing the first row of pixel regions for display subframe No. 1 is the data about the pixels on the first row R1 that is stored in the R frame memory. The data representing the second row of pixel regions for display subframe No. 1 is the data about the pixels on the second row G2 that is stored in the G frame memory. The data representing the third row of pixel regions for display subframe No. 1 is the data about the pixels on the third row B3 that is stored in the B frame memory. And the data representing the fourth row of pixel regions for display subframe No. 1 is the data about the pixels on the fourth row R4 that is stored in the R frame memory. The data representing the remaining rows of display subframe No. 1 will be made up in the same manner after that.

The data representing display subframe No. 2 or 3 is also collected as in display subframe No. 1. As for display subframe No. 2, for example, the data representing the zeroth row of pixel regions is the data about the pixels on the first row B1 that is stored in the B frame memory. The data representing the first row of pixel regions for display subframe No. 2 is the data about the pixels on the second row R2 that is stored in the R frame memory. The data representing the second row of pixel regions for display subframe No. 2 is the data about the pixels on the third row G3 that is stored in the G frame memory. And the data representing the third row of pixel regions for display subframe No. 2 is the data about the pixels on the fourth row B4 that is stored in the B frame memory.

In this manner, the data subsets that have been read out from the R, G and B frame memories are combined in a predetermined order, thereby compiling data representing each of the subframes to be displayed time-sequentially. Thus, the data representing each subframe contains information about all of the three primary colors of R, G and B. However, as for each of these colors R, G and B, the information contained is about just one-third of the entire screen, spatially speaking. More specifically, as can be easily seen from FIG. 5, display subframe No. 1 includes the data about the pixels on the first, fourth, seventh, tenth rows, etc. of the R image frame, the data about the pixels on the second, fifth, eighth, eleventh rows, etc. of the G image frame, and the data about the pixels on the third, sixth, ninth, twelfth rows, etc. of the B image frame. Display subframe No. 2 includes the data about the pixels on the first, fourth, seventh, tenth rows, etc. of the B image frame, the data about the pixels on the second, fifth, eighth, eleventh rows, etc. of the R image frame, and the data about the pixels on the third, sixth, ninth, twelfth rows, etc. of the G image frame. Display subframe No. 3 includes the data about the pixels on the first, fourth, seventh, tenth rows, etc. of the G image frame, the data about the pixels on the second, fifth, eighth, eleventh rows, etc. of the B image frame, and the data about the pixels on the third, sixth, ninth, twelfth rows, etc. of the R image frame. It should be noted that the total number of rows of pixel regions of the display panel is larger by two than the number of pixel rows that make up one subframe image as shown in FIG. 5. These two additional rows are provided as a margin for optical shifting.

To reproduce the original image frame, the first row of the R image frame, the first row of the B image frame and the first row of the G image frame must be combined together. As shown in FIG. 5, the information about the first row of the R image frame is allocated to the first row of display subframe No. 1, the information about the first row of the B image frame is allocated to the zeroth row of display subframe No. 2, and the information about the first row of the G image frame is allocated to the minus first row of display subframe No. 3. Accordingly, each of these image subframes is presented on the projection plane after having been shifted by one pixel from the previous image subframe. Specifically, display subframe No. 2 is shifted by one pixel from display subframe No. 1 and display subframe No. 3 is shifted by two pixels from display subframe No. 1. In this manner, these three display subframes are shifted and presented one after another on each pixel on the projection plane. This optical shifting between each pair of subframes is done by the optical shifter 10 to be driven by the driver 15.

The method of generating subframes and the method of presenting the subframes time sequentially are not limited to those described above. For example, more than three subframes may be presented time sequentially as disclosed in pamphlet of PCT International Publication No. WO 01/96932.

Hereinafter, the optical shifter 10 and a method of shifting the image subframes using the optical shifter 10 will be described.

EMBODIMENT 1

Figure 7:
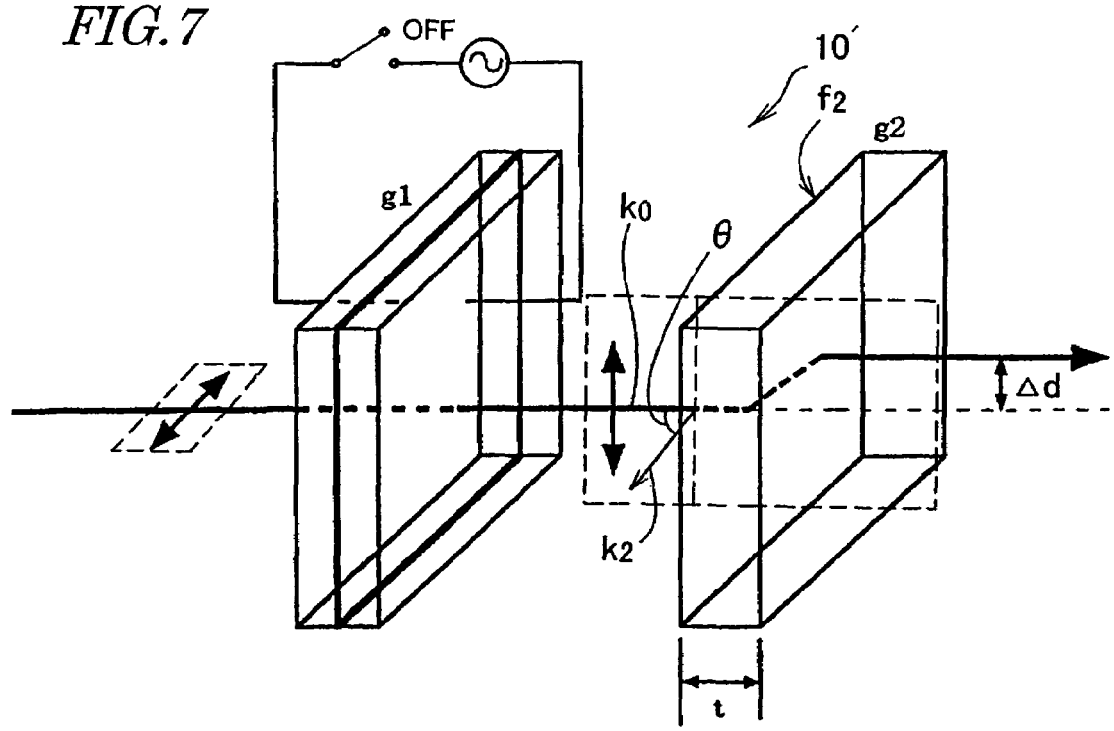
FIGS. 7 and 8 are schematic representations showing the configuration and operation of an optical shifting section of an optical shifter.
Figure 8:
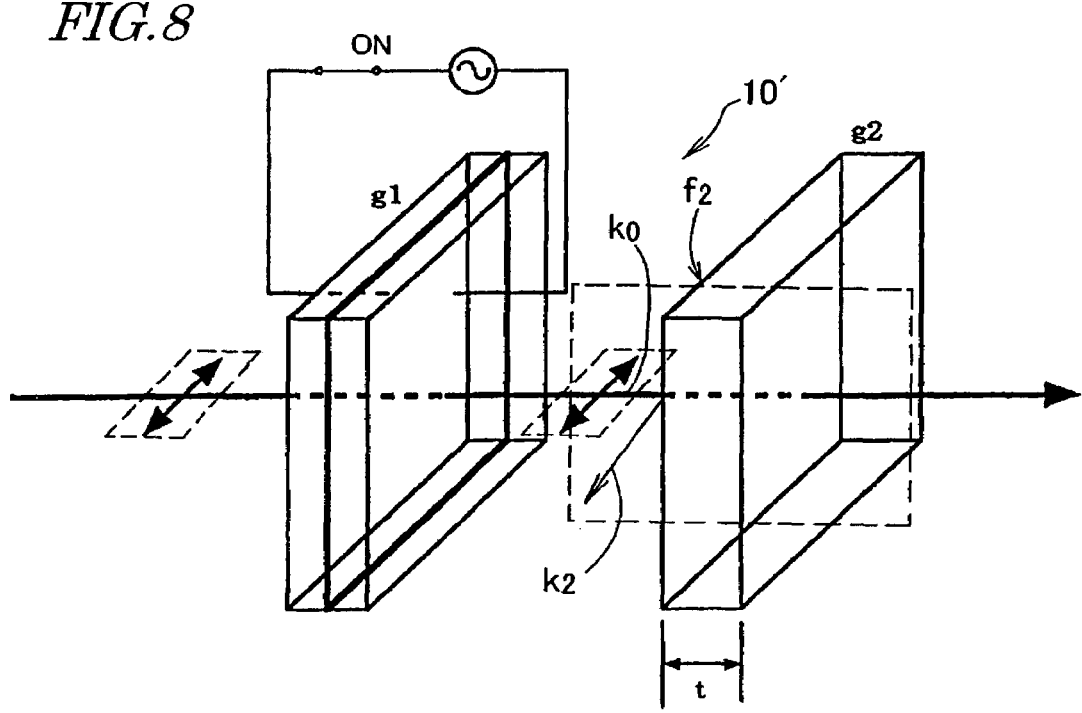

FIGS. 7 and 8 schematically illustrate an optical shifting section 10' included in the optical shifter 10. The optical shifting section 10' preferably includes: a first element (e.g., a liquid crystal element) g1 for changing the polarization direction of an image subframe that has been modulated by the display panel 8 (see FIG. 1) by switching the polarization direction of the incoming light ray between two directions that are perpendicular to each other; and a second element g2 (e.g., a quartz plate) that exhibits one of multiple different refractive indices according to the polarization direction of the incoming light ray. In this specific preferred embodiment, the first element is preferably a liquid crystal element, which is typically a liquid crystal cell including a liquid crystal layer and two electrodes for use to apply a voltage to the liquid crystal layer, and the second element is preferably a quartz plate. As used herein, the "polarization direction" means the direction in which the electric vector of a light ray vibrates. The polarization direction is perpendicular to the propagation direction of a light ray. Also, a plane that includes both the electric vector and the light propagation direction will be referred to herein as a "vibration plane" or "polarization plane".

In the example shown in FIGS. 7 and 8, the light that has gone out of the display panel is polarized horizontally (i.e., polarization direction=horizontal direction on the screen). While no voltage is being applied to the liquid crystal layer of the liquid crystal element g1, the light that has gone out of the display panel has its polarization plane rotated 90 degrees by the liquid crystal layer as shown in FIG. 7. On the other hand, while an appropriate voltage is being applied to the liquid crystal layer of the liquid crystal cell g1, the light that has gone out of the display panel does not have its polarization plane rotated as shown in FIG. 8 while being transmitted through the liquid crystal element g1. In this example, the angle of rotation is supposed to be 90 degrees. However, the angle of rotation may be defined arbitrarily depending on the design of the liquid crystal layer.

The quartz plate g2 preferably consists of uniaxial crystals (or positive crystals) and preferably exhibits birefringence. Thus, the quartz plate g2 exhibits one of multiple different refractive indices according to the polarization direction of the incoming light ray. The quartz plate g2 is preferably arranged such that its incident plane f2 crosses the optical axis k0 of the incoming light ray (which is parallel to the propagation direction) at right angles. The optic axis k2 of the quartz plate g2 is included in a perpendicular plane in FIGS. 7 and 8 but still tilts away from the incident plane f2 of the quartz plate g2. As used herein, the "optical axis" means the axis of rotation symmetry of a light ray, while the "optic axis" means a direction in which no birefringence occurs in birefringent crystals. Accordingly, when a light ray having the vertical polarization direction is incident onto the quartz plate g2, the light ray is refracted on the plane, including the optic axis k2, according to the angle θ defined between the optical axis k0 and the optic axis k2 of the quartz plate g2. As a result, the incoming light ray is vertically shifted by Δd as shown in FIG. 7. In this case, a plane that includes both the optic axis k2 of the quartz plate g2 and the optical axis k0 of the incoming light ray (which will be referred to herein as a "principal section") is parallel to the plane of polarization of the incoming light ray. Such an incoming light ray having a plane of polarization that is parallel to the principal section is an "extraordinary ray" for the quartz plate g2. In this case, the angle θ is preferably at most equal to 90 degrees.

On the other hand, as shown in FIG. 8, when a light ray having a horizontal plane of polarization is incident onto the quartz plate g2, the light ray is neither refracted nor shifted. This is because the plane of polarization crosses the optic axis k2 of the quartz plate g2 (or the principal section) at right angles. In that case, the light ray that is incident onto the quartz plate g2 is an "ordinary ray" for the quartz plate g2.

In this manner, the polarization direction of the light ray that is going to enter the quartz plate g2 is controlled by selectively applying a voltage to the liquid crystal element g1 and the shift of the light ray going out of the quartz plate g2 is adjusted by making the light ray with one of multiple different polarization directions incident onto the quartz plate g2. In the preferred embodiment described above, a horizontally polarized light ray is incident onto the liquid crystal element g1 and then vertically shifted by the quartz plate g2. Alternatively, a vertically polarized light ray may be incident onto the liquid crystal element g1 and then horizontally shifted by the quartz plate g2.

Figure 9:
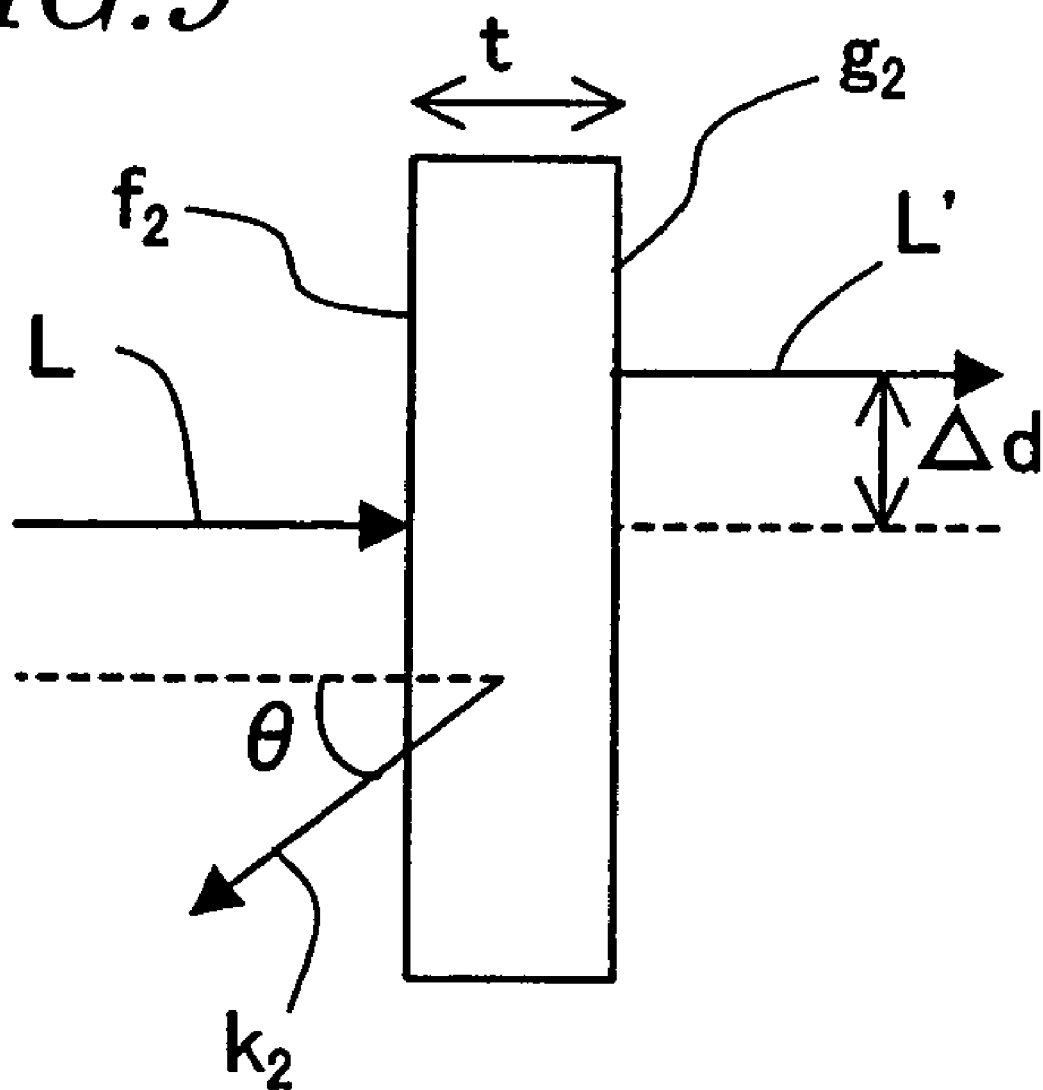
FIG. 9 shows a relationship between the optic axis of a quartz plate for use in the optical shifting section and the direction in which the optical axis of a light ray being transmitted is shifted.

Suppose the quartz plate g2 has a thickness of t, the refractive indices of the quartz plate g2 against an extraordinary ray and an ordinary ray are $n_e$ and $n_o$, respectively, and the optic axis k2 defines a tilt angle θ in the principal section with respect to a normal to the incident plane f2 as shown in FIG. 9. Then, the magnitude of shift ΔD of the outgoing light ray L' from the light ray L that was incident perpendicularly onto the quartz plate g2 is given by $$\Delta d = (n_e^2 - n_o^2)\sin\theta\cos\theta \cdot t / n_e^2 \cos^2\theta + n_o^2 \sin^2\theta \quad (1)$$

where Δd is the magnitude of shift, $n_e$ is the refractive index against the extraordinary ray, $n_o$ is the refractive index against the ordinary ray, θ is the angle defined by the optic axis k2 with respect to a normal to the incident plane, and t is the thickness of the quartz plate.

On the other hand, the magnitude of shift Δd of the outgoing light ray from a light ray that was incident obliquely onto the quartz plate g2 is obtained by regarding the angle defined by the optical axis of the light ray that has been incident onto the medium with respect to the optic axis of the quartz as θ in Equation (1) and by applying Snell laws of refraction to calculation between the quartz plate g2 and the medium that contacts with the quartz plate g2.

As can be seen from Equation (1), the magnitude of shift ΔD of the light ray is proportional to the thickness of t of the quartz plate g2 and is also changeable with the angle θ defined by the optic axis k2. Thus, by adjusting the thickness of t of the quartz plate g2 and the angle θ defined by the optic axis k2, the magnitude of shift of an image subframe can be adjusted to an arbitrary value.

In the optical shifting section of this preferred embodiment, the liquid crystal layer is sandwiched between a pair of transparent electrodes so that an appropriate voltage can be applied to the overall liquid crystal layer at a time. Also, in this preferred embodiment, a TN liquid crystal material with positive dielectric anisotropy Δ∈ is used such that the incoming light ray does not have its polarization direction rotated by aligning the orientation directions of the liquid crystal molecules with the direction of an electric field while a voltage is being applied thereto, and that the incoming light ray has its polarization direction rotated 90 degrees by twisting the orientation directions of the liquid crystal molecules 90 degrees while no voltage is being applied thereto. Alternatively, a TN liquid crystal material with negative dielectric anisotropy Δ∈ may also be used such that the incoming light ray has its polarization direction rotated 90 degrees while a voltage is being applied to the liquid crystal layer and that the incoming light ray does not have its polarization direction rotated while no voltage is being applied thereto.

In this preferred embodiment, the optical shifting section 10' is designed such that an appropriate voltage can be applied to the overall liquid crystal layer at a time. Alternatively, the voltage may also be applied to only a portion of the liquid crystal layer. More preferably, the voltage is sequentially applied to associated portions of the liquid crystal layer synchronously with the scanning of the display panel.

As described above, the optical shifting section 10' can shift the image by Δd by selectively taking either the state shown in FIG. 7 or the state shown in FIG. 8. That is to say, the optical shifting section 10' can select one of two different positions. However, as already described with reference to FIGS. 4 through 6, to superpose the R. G and B light rays one upon the other on the projection plane, the image subframe that has been modulated by the display panel needs to be shifted by one or two pixels on the projection plane. Accordingly, the optical shifter 10 must choose one of at least three different positions.

For that purpose, the optical shifter 10 of this preferred embodiment includes two optical shifting sections 10' such as that shown in FIG. 7 or 8. By arranging these two optical shifting sections 10' in series on the optical path, the optical shifter 10 can selectively shift the image to one of at most four different positions. This optical shifter 10 can select one of four different positions on the projection plane according to the voltage application states of the liquid crystal layers of the two optical shifting sections 10' on the light incoming and outgoing sides on the optical path.

Hereinafter, a method of driving the optical shifter 10 by applying voltages to the liquid crystal layers of the two optical shifting sections 10' will be described. In the following description, if the liquid crystal molecules of a liquid crystal layer are oriented so as not to change the polarization direction of an incoming light ray with a voltage, which is at least equal to a predetermined value, applied to the liquid crystal layer, then the liquid crystal layer will be regarded herein as "turned ON". On the other hand, if the liquid crystal molecules of a liquid crystal layer are allowed to be twisted by 90 degrees with no voltage applied to the liquid crystal layer, then the liquid crystal layer will be regarded herein as "turned OFF". Alternatively, the liquid crystal layer may also be turned OFF by applying a voltage, which is smaller than the predetermined value, to the liquid crystal layer.

As described above, each of the two optical shifting sections 10' can take one of two different states according to the voltage being applied to the liquid crystal element g1 thereof. However, the response speed of the liquid crystal molecules to the applied voltage normally changes significantly depending on whether the liquid crystal layer is going to be turned ON with the predetermined voltage applied thereto or going to be turned OFF with the applied voltage removed therefrom. That is to say, the response speed of the liquid crystal material that is going to be turned ON is higher than that of the liquid crystal material that is going to be turned OFF. Accordingly, if the liquid crystal layer of the liquid crystal element g1 in one of the two optical shifting sections 10' is switched from OFF into ON while the liquid crystal layer of the liquid crystal element g1 in the other optical shifting section 10' is switched from ON into OFF at the same time, then an unwanted intermediate (ON·ON) stage exists before the two liquid crystal layers in the OFF and ON states are turned ON and OFF, respectively. Such state transitions will be denoted herein as (OFF·ON)→ (ON·ON)→(ON·OFF). This is because the liquid crystal material that is going to be turned OFF is slower in response than the liquid crystal material that is going to be turned ON. Thus, the two liquid crystal layers of the liquid crystal elements g1 in the two optical shifting sections 10' are both turned ON albeit temporarily, thereby shifting the image to an unexpected position. As a result, the resolution decreases and a periodic dotted pattern appears on the projection plane, thus deteriorating the quality of the image projected.

To avoid such deterioration in image quality, if the voltages being applied to the two liquid crystal layers need to be changed simultaneously, then the optical shifter 10 is preferably driven such that the two liquid crystal layers of the liquid crystal elements g1 in the two optical shifting sections 10' are both switched either from OFF into ON or from ON into OFF at the same time. The response speed of the liquid crystal material that is going to be turned OFF is relatively low as described above. Accordingly, the period of time in which the two liquid crystal layers are both going to be turned OFF is preferably as short as possible.

However, such an unwanted intermediate stage never appears if only one of the two liquid crystal layers of the liquid crystal elements g1 in the first and second optical shifting sections 10'a and 10'b is turned ON or OFF while the other liquid crystal layer is kept ON or OFF.

Consequently, if the optical axis of an incoming light ray is shifted by the optical shifter 10, the optical shifter 10 is preferably driven such that one of the two liquid crystal layers of the liquid crystal elements g1 in the first and second optical shifting sections 10'a and 10'b is switched either from ON into OFF or from OFF into ON with the other liquid crystal layer kept ON or OFF. Alternatively, the optical shifter 10 may also be driven such that the two liquid crystal layers of the liquid crystal elements g1 in the first and second optical shifting sections 10'a and 10'b are both switched either from ON into OFF or from OFF into ON.

Figure 10:
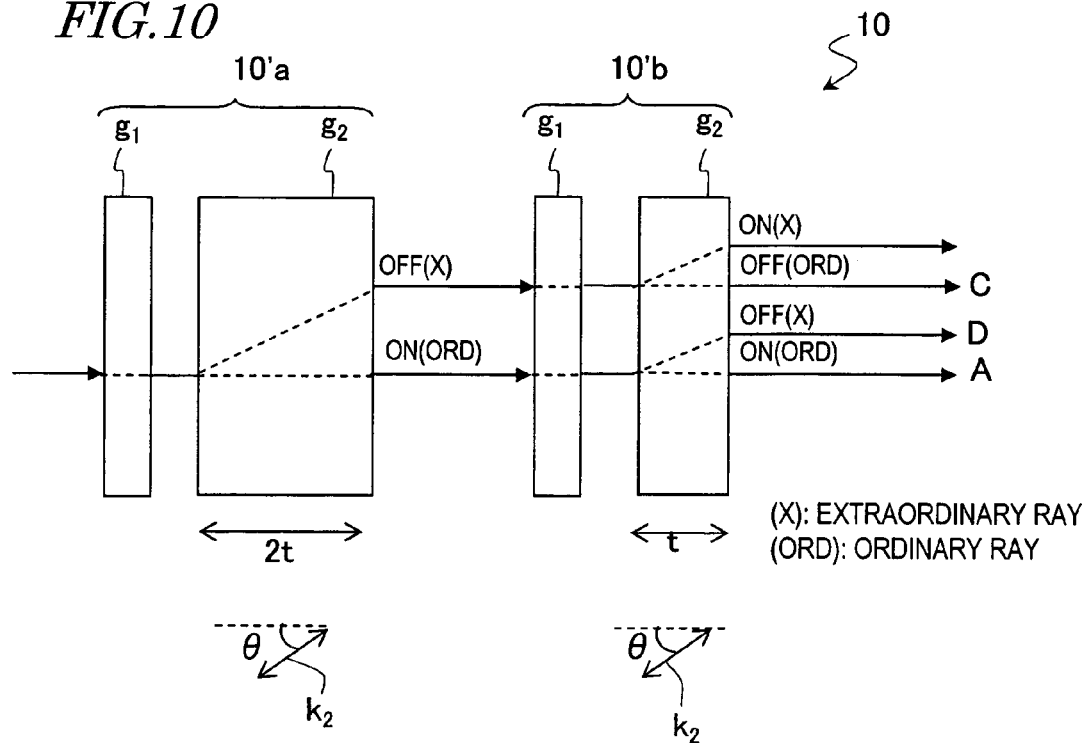
FIG. 10 is a schematic representation showing an optical shifter according to a first specific preferred embodiment of the present invention.

FIG. 10 shows an exemplary optical shifter 10 including two optical shifting sections 10'a and 10'b according to this preferred embodiment. More specifically, the optical shifter 10 shown in FIG. 10 preferably includes a first optical shifting section 10'a, which includes a quartz plate g2 with a thickness of 2 t and is provided on the light incoming side, and a second optical shifting section 10'b, which includes a quartz plate g2 with a thickness of t and is provided on the light outgoing side, such that the light transmitted through the first optical shifting section 10'a is incident onto, and transmitted through, the second optical shifting section 10'b. As described above, the liquid crystal elements g1 of the first and second optical shifting sections 10'a and 10'b are both TN mode liquid crystal cells. That is to say, each of these liquid crystal elements g1 is designed so as not to change the polarization direction of the incoming light ray when a voltage is applied thereto and to rotate the polarization direction thereof 90 degrees when no voltage is applied thereto.

Since the quartz plate g2 of the first optical shifting section 10'a is twice as thick as that of the second optical shifting section 10'b, the magnitude of shift caused by the first optical shifting section 10'a between the optical axes of the incoming and outgoing light rays thereof is twice greater than that of shift caused by the second optical shifting section 10'b between the optical axes of the incoming and outgoing light rays thereof.

In this case, the optic axes k2 of the quartz plates g2 of the first and second optical shifting sections 10'a and 10'b are both located on a plane that is parallel to the paper, and tilt toward the same direction with respect to the optical axis of the incoming light ray. That is to say, the two optic axes k2 point to the same direction. Accordingly, the direction in which the extraordinary ray is refracted by the first optical shifting section 10'a is the same as the direction in which the extraordinary ray is refracted by the second optical shifting section 10'b. Also, the polarization direction of the extraordinary ray transmitted through the first optical shifting section 10'a defines an angle of 90 degrees with that of the ordinary ray transmitted through the first optical shifting section 10'a. Consequently, the condition of shifting this extraordinary ray being transmitted through the second optical shifting section 10'b is opposite to the condition of shifting the ordinary ray being transmitted through the second optical shifting section 10'b.

In this preferred embodiment, each image frame is preferably divided into three display subframes. Also, as shown in FIG. 6, the optical shifter 10 is preferably used so as not to shift display subframe No. 1 but to shift display subframes Nos. 2 and 3 by one pixel and by two pixels, respectively. The non-shifted position, one-pixel-shifted position and two-pixel-shifted position will be referred to herein as Positions A, B and C, respectively, as shown in FIG. 6.

As shown in FIG. 10, if the liquid crystal element g1 of the first optical shifting section 10'a is turned ON with a voltage applied thereto and if the liquid crystal element g1 of the second optical shifting section 10'b is also turned ON with a voltage applied thereto, for example, the light ray that has been incident onto the optical shifter 10 will be projected to Position A. On the other hand, if the liquid crystal element g1 of the first optical shifting section 10'a is turned OFF with no voltage applied thereto but if the liquid crystal element g1 of the second optical shifting section 10'b is turned ON with a voltage applied thereto, then the light ray that has been incident onto the optical shifter 10 will be projected to Position C. In this preferred embodiment, three display subframes are used and projected to three different positions. Thus, the optical shifter 10 can project the outgoing light ray onto four shift positions, one of which is not used, though.

Figure 11:
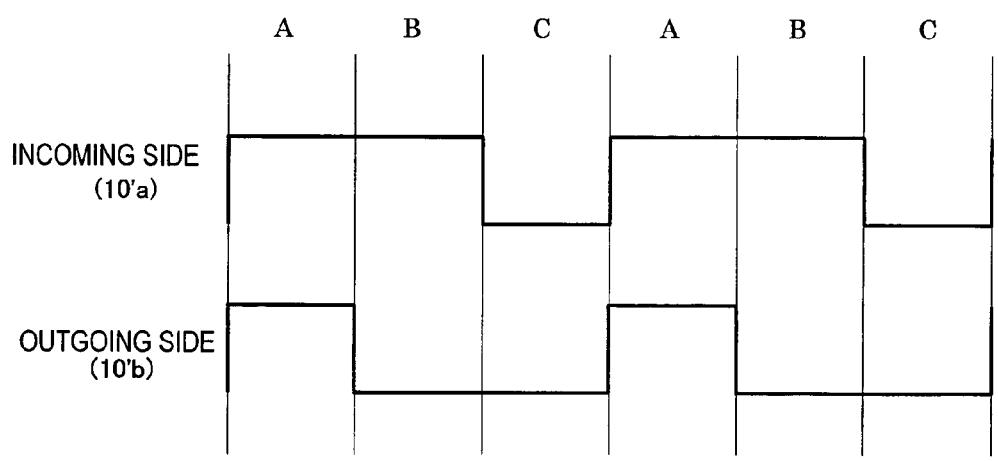
FIG. 11 shows the waveforms of drive voltages applied to drive the optical shifter shown in FIG. 10.

FIG. 11 shows the respective drive voltages to be applied to the liquid crystal elements g1 of the first and second optical shifting sections 10'a and 10'b when a display subframe is displayed while being shifted by the optical shifter 10 shown in FIG. 10 in the order of Positions A, B, C, A, B, C and so on.

As shown in FIG. 11, in the period in which the display subframe is displayed at Position A, voltages are applied simultaneously to the liquid crystal elements g1 of the first and second optical shifting sections 10'$a$ and 10'$b$. Next, in the period in which the display subframe is displayed at Position B, the voltage being applied to the liquid crystal element g1 of the first optical shifting section 110$a$ is held as it is, but the supply of the voltage to the liquid crystal element g1 of the second optical shifting section 10'$b$ is stopped. Subsequently, in the period in which the display subframe is displayed at Position C, the supply of the voltage to the liquid crystal element g1 of the first optical shifting section 10'$a$ is stopped and no voltage is still applied to the liquid crystal element g1 of the second optical shifting section 10'$b$. Such drive voltages are generated by the driver 15 and then repeatedly applied to the liquid crystal elements g1 of the first and second optical shifting sections 10'$a$ and 10'$b$.

As shown in FIG. 11, the two drive voltages to be applied to the liquid crystal elements g1 of the first and second optical shifting sections 10'$a$ and 10'$b$ are simultaneously raised from the low level to the high level when the display subframe is shifted from Position C to Position A. However, these two drive voltages never change simultaneously at any other time. Thus, according to this driving method, the display subframe can be shifted just as intended and a high-resolution image of quality can be displayed without deteriorating the quality of the projected image due to a decrease in resolution or the appearance of a periodic dotted pattern on the projection plane.

Figure 12:
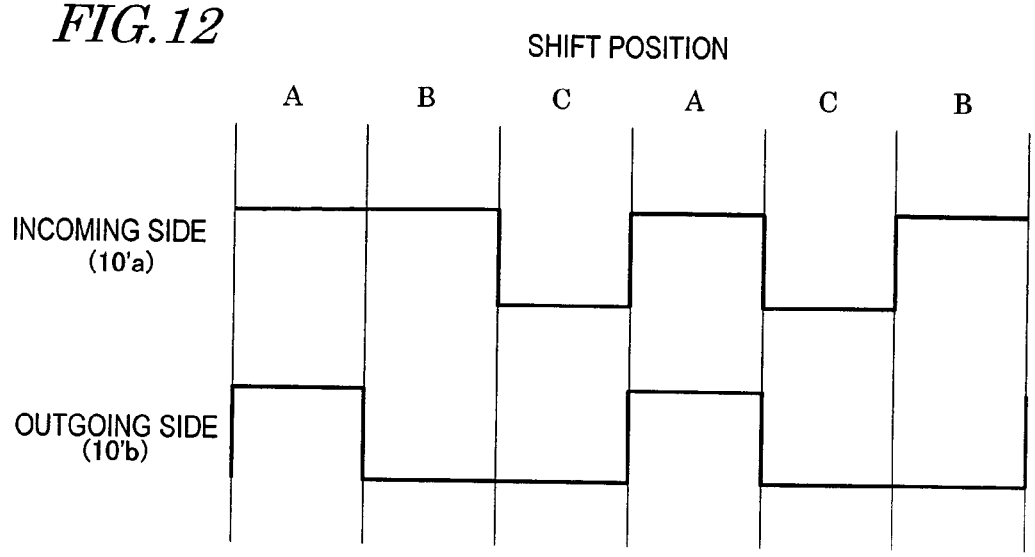
FIG. 12 shows the waveforms of drive voltages applied to drive the optical shifter shown in FIG. 10 by another method.

FIG. 12 shows the respective drive voltages to be applied to the liquid crystal elements g1 of the first and second optical shifting sections 10'$a$ and 10'$b$ when a display subframe is displayed while being shifted by the optical shifter 10 shown in FIG. 10 in the order of Positions A, B, C, A, C, B and so on.

As shown in FIG. 12, the two drive voltages to be applied to the liquid crystal elements g1 of the first and second optical shifting sections 10'$a$ and 10'$b$ are simultaneously raised from the low level to the high level when the display subframe is shifted from Position C to Position A, and simultaneously lowered from the high level to the low level when the display subframe is shifted from Position A to Position C. However, these two drive voltages never change simultaneously at any other time. The two drive voltages simultaneously change from the high level to the low level once a period. But since this is the smallest number of times, the image quality is affected just slightly.

Thus, according to this driving method, the display subframe can be shifted just as intended and a high-resolution image of quality can be displayed without deteriorating the quality of the projected image due to a decrease in resolution or the appearance of a periodic dotted pattern on the projection plane.

Figure 13:
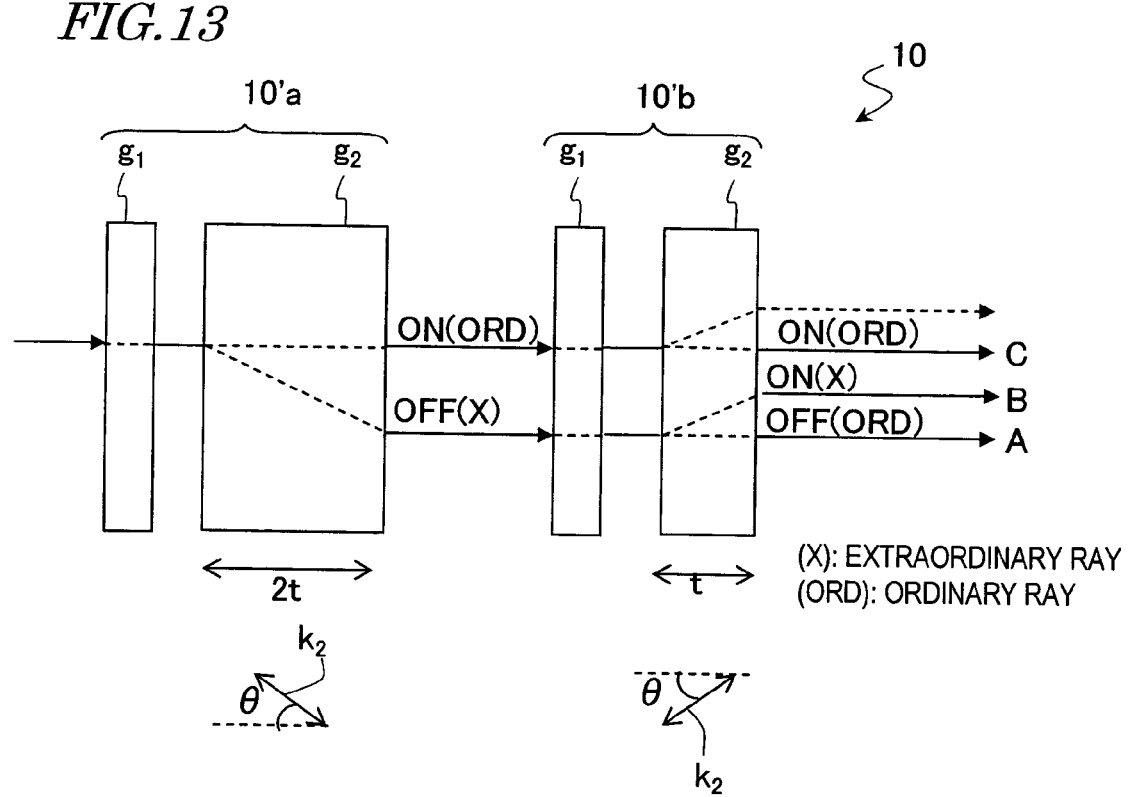
FIG. 13 is a schematic representation showing another optical shifter according to the first preferred embodiment.

FIG. 13 shows another exemplary optical shifter 10 including two optical shifting sections 10'$a$ and 10'$b$ according to this preferred embodiment. More specifically, the optical shifter 10 shown in FIG. 13 preferably includes a first optical shifting section 10'$a$, which includes a quartz plate g2 with a thickness of 2 t and is provided on the light incoming side, and a second optical shifting section 10'$b$, which includes a quartz plate g2 with a thickness of t and is provided on the light outgoing side. In this case, the optic axes k2 of the quartz plates g2 of the first and second optical shifting sections 10'$a$ and 10'$b$ are both located on a plane that is parallel to the paper, but tilt toward mutually opposite directions with respect to the optical axis of the incoming light ray. Accordingly, the direction in which the extraordinary ray is refracted by the first optical shifting section 10'$a$ is opposite to the direction in which the extraordinary ray is refracted by the second optical shifting section 10'$b$.

Figure 14:
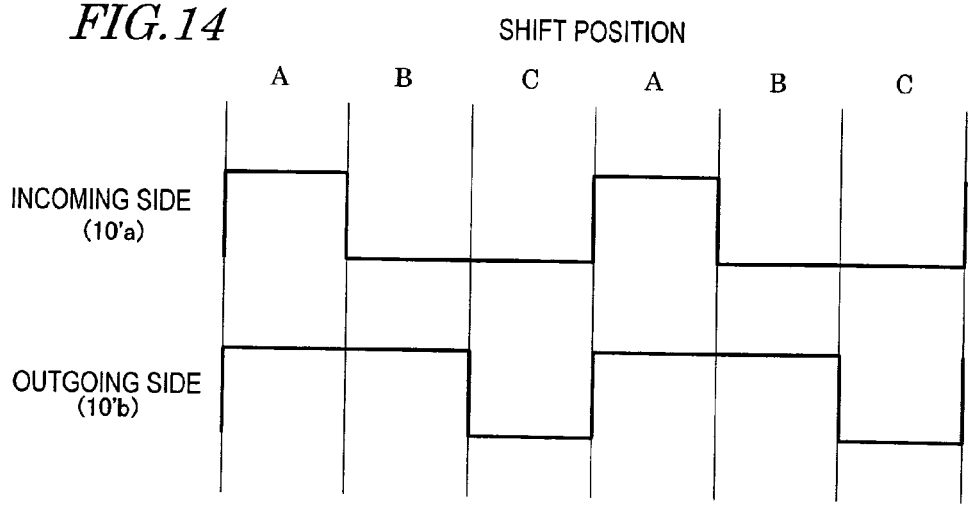
FIG. 14 shows the waveforms of drive voltages applied to drive the optical shifter shown in FIG. 13.

FIG. 14 shows the respective drive voltages to be applied to the liquid crystal elements g1 of the first and second optical shifting sections 10'$a$ and 10'$b$ when a display subframe is displayed while being shifted by the optical shifter 10 shown in FIG. 13 in the order of Positions A, B, C, A, B, C and so on.

As shown in FIG. 14, in the period in which the display subframe is displayed at Position A, voltages are applied simultaneously to the liquid crystal elements g1 of the first and second optical shifting sections 10'$a$ and 10'$b$. Next, in the period in which the display subframe is displayed at Position B, the supply of the voltage to the liquid crystal element g1 of the first optical shifting section 10'$a$ is stopped but the voltage being applied to the liquid crystal element g1 of the second optical shifting section 10'$b$ is held as it is. Subsequently, in the period in which the display subframe is displayed at Position C, no voltage is still applied to the liquid crystal element g1 of the first optical shifting section 10'$a$ and the supply of the voltage to the liquid crystal element g1 of the second optical shifting section 10'$b$ is stopped. Such drive voltages are generated by the driver 15 and then repeatedly applied to the liquid crystal elements g1 of the first and second optical shifting sections 10'$a$ and 10'$b$.

As shown in FIG. 14, the two drive voltages to be applied to the liquid crystal elements g1 of the first and second optical shifting sections 10'$a$ and 10'$b$ are simultaneously raised from the low level to the high level when the display subframe is shifted from Position C to Position A. However, these two drive voltages never change simultaneously at any other time. Thus, according to this driving method, the display subframe can be shifted just as intended and a high-resolution image of quality can be displayed without deteriorating the quality of the projected image due to a decrease in resolution or the appearance of a periodic dotted pattern on the projection plane.

Figure 15:
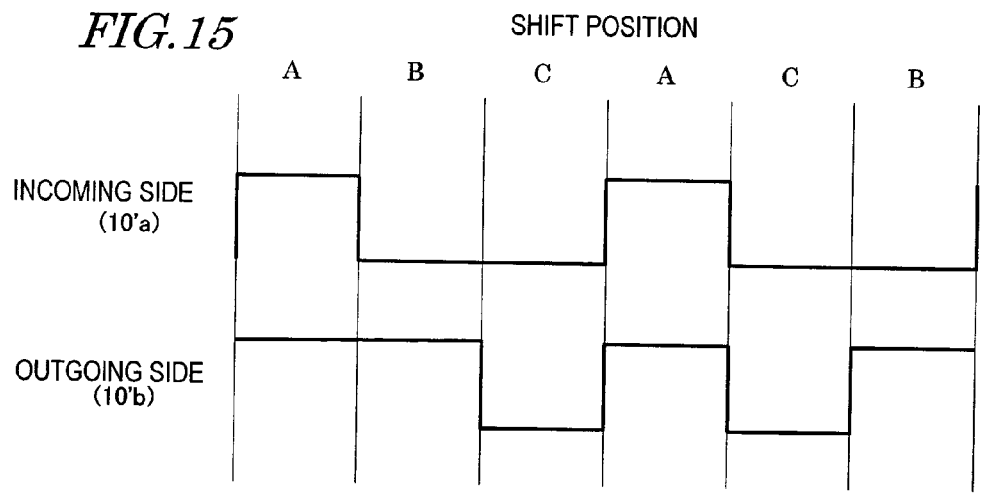
FIG. 15 shows the waveforms of drive voltages applied to drive the optical shifter shown in FIG. 13 by another method.

FIG. 15 shows the respective drive voltages to be applied to the liquid crystal elements g1 of the first and second optical shifting sections 10'$a$ and 10'$b$ when a display subframe is displayed while being shifted by the optical shifter 10 shown in FIG. 13 in the order of Positions A, B, C, A, C, B and so on.

As shown in FIG. 15, the two drive voltages to be applied to the liquid crystal elements g1 of the first and second optical shifting sections 10'$a$ and 10'$b$ are simultaneously raised from the low level to the high level when the display subframe is shifted from Position C to Position A, and simultaneously lowered from the high level to the low level when the display subframe is shifted from Position A to Position C. However, these two drive voltages never change simultaneously at any other time. The two drive voltages simultaneously change from the high level to the low level once a period. But since this is the smallest number of times, the image quality is affected just slightly.

Thus, according to this driving method, the display subframe can be shifted just as intended and a high-resolution image of quality can be displayed without deteriorating the quality of the projected image due to a decrease in resolution or the appearance of a periodic dotted pattern on the projection plane.

EMBODIMENT 2

Hereinafter, a second specific preferred embodiment of the present invention will be described. In this preferred embodiment, the optical shifting section 10' of the optical shifter 10 includes a liquid crystal element g1 with two liquid crystal layers. In the optical shifting section 10' of this preferred embodiment shown in FIG. 16, the liquid crystal element g1 preferably includes a first liquid crystal layer 75a and a second liquid crystal layer 75b. Each of the first and second liquid crystal layers 75a and 75b is sandwiched between two transparent electrodes, thereby making a liquid crystal cell. Thus, an appropriate voltage can be applied to the overall liquid crystal layer at a time.

The first and second liquid crystal layers 75a and 75b are made of TN mode liquid crystal materials with mutually opposite optical rotatory directions. For example, the first liquid crystal layer 75a may be dextrorotatory while the second liquid crystal layer 75b may be levorotatory. FIGS. 17A through 17D show relationships between the voltages being applied to the first and second liquid crystal layers 75a and 75b and the orientation states of the liquid crystal molecules. As shown in FIG. 17A, when the first and second liquid crystal layers 75a and 75b are both OFF with no voltages applied thereto, the first and second liquid crystal layers 75a and 75b are arranged such that each pair of directors crosses each other at right angles on a plane on which the first and second liquid crystal layers 75a and 75b face each other. Accordingly, if a horizontally polarized light ray is incident onto the first liquid crystal layer 75a, the light ray has its polarization direction rotated 90 degrees by the first liquid crystal layer 75a to leave the first liquid crystal layer 75a as a vertically polarized light ray. Next, the vertically polarized light ray is incident onto the second liquid crystal layer 75b, and has its plane of polarization rotated 90 degrees to the opposite direction by the second liquid crystal layer 75b. Consequently, the outgoing light ray of the second liquid crystal layer 75b is also horizontally polarized, i.e., has the same polarization direction as the light ray that entered the first liquid crystal layer 75a. That is to say, when the first and second liquid crystal layers 75a and 75b are both OFF, the incoming and outgoing light rays of the optical shifting section 10' both have the same polarization direction. Such a state will be referred to herein as "non-rotated".

On the other hand, when the first liquid crystal layer 75a is OFF and the second liquid crystal layer 75b is ON as shown in FIG. 17B, the horizontally polarized incoming light ray has its polarization direction rotated 90 degrees by the first liquid crystal layer 75a but does not have its polarization direction changed by the second liquid crystal layer 75b. Consequently, if the first liquid crystal layer 75a is OFF and the second liquid crystal layer 75b is ON, the incoming light ray has its polarization direction rotated 90 degrees in the end. Such a state will be referred to herein as "rotated".

Furthermore, when the first and second liquid crystal layers 75a and 75b are both ON as shown in FIG. 17C, the polarization direction of the incoming light ray is not changed by any of the two liquid crystal layers 75a and 75b. Consequently, when the first and second liquid crystal layers 75a and 75b are both ON, the incoming and outgoing light rays of the optical shifting section 10' both have the same polarization direction. Such a state will also be referred to herein as "non-rotated".

Furthermore, when the first liquid crystal layer 75a is ON and the second liquid crystal layer 75b is OFF as shown in FIG. 17D, the horizontally polarized incoming light ray enters the second liquid crystal layer 75b without having had its polarization direction rotated by the first liquid crystal layer 75a. The second liquid crystal layer 75b rotates the polarization direction of this light ray 90 degrees. Consequently, if the first liquid crystal layer 75a is ON and the second liquid crystal layer 75b is OFF, the incoming light ray has its polarization direction rotated 90 degrees in the end. Such a state will also be referred to herein as "rotated".

Next, the transitions between the states shown in FIGS. 17A through 17D will be described. In this case, the same statements as those presented about the situation where the voltages being applied to the liquid crystal elements g1 of the first and second optical shifting sections 10'a and 10'b are changed in the first preferred embodiment described above apply as they are. That is to say, if one of the two liquid crystal layers is switched from ON into OFF and the other liquid crystal layer is switched from OFF into ON at the same time, then an unwanted intermediate state comes about due to the difference in the response speed between the liquid crystal material that is going to be turned OFF and the liquid crystal material that is going to be turned ON. As a result, the image quality is deteriorated as already described for the first preferred embodiment. For that reason, a transition from the state shown in FIG. 17B into the state shown in FIG. 17D, or vice versa, is not preferred.

If the first and second liquid crystal layers 75a and 75b are both switched from ON into OFF, then the response speeds of the liquid crystal materials should be low. However, each pair of liquid crystal molecules in the first and second liquid crystal layers 75a and 75b has mutually opposite optical rotatory directions and changes their orientation directions at the same speed. Accordingly, while the first and second liquid crystal layers 75a and 75b are making a transition into the OFF state, the liquid crystal molecules are twisted such that the rotations of the plane of polarization caused by the first and second liquid crystal layers 75a and 75b always cancel each other. Consequently, while the first and second liquid crystal layers 75a and 75b are making a transition from the state shown in FIG. 17C into the state shown in FIG. 17A, the light ray that entered the first liquid crystal layer 75a leaves the second liquid crystal layer 75b with its polarization direction always unchanged.

It should be noted, however, that it normally takes about 5 ms to about 10 ms for a liquid crystal layer to complete the transition from the ON state into the OFF state. Accordingly, if one of the two liquid crystal layers is turned ON again before the two liquid crystal layers complete their transitions, then the unwanted intermediate state should appear to deteriorate the image quality significantly. For that reason, if the first and second liquid crystal layers 75a and 75b are both turned from ON into OFF at the same time, the interval in which each of these liquid crystal layers is in OFF state, i.e., after the voltage stopped being applied and before the voltage starts being applied again, is preferably longer than at least one subframe period, and more preferably longer than two or more subframe periods.

Figure 16:
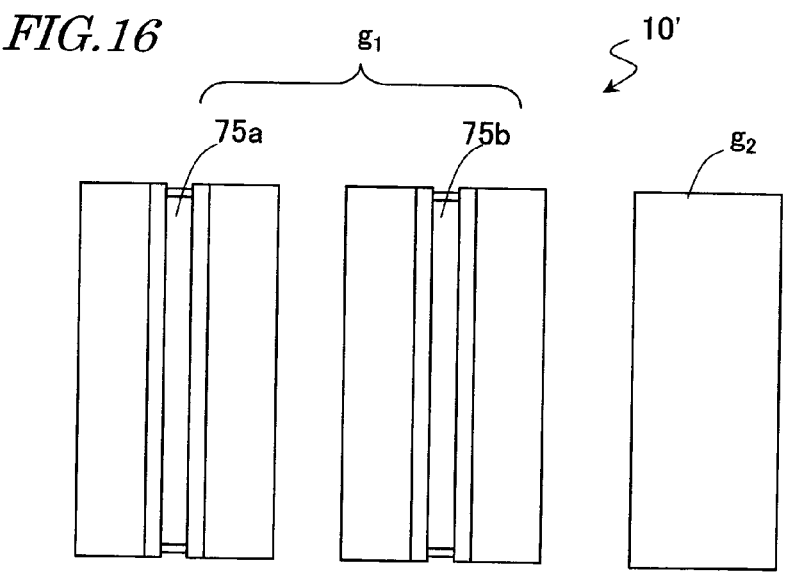
FIG. 16 is a schematic representation showing an optical shifting section of an optical shifter according to a second specific preferred embodiment of the present invention.
Figure 18:
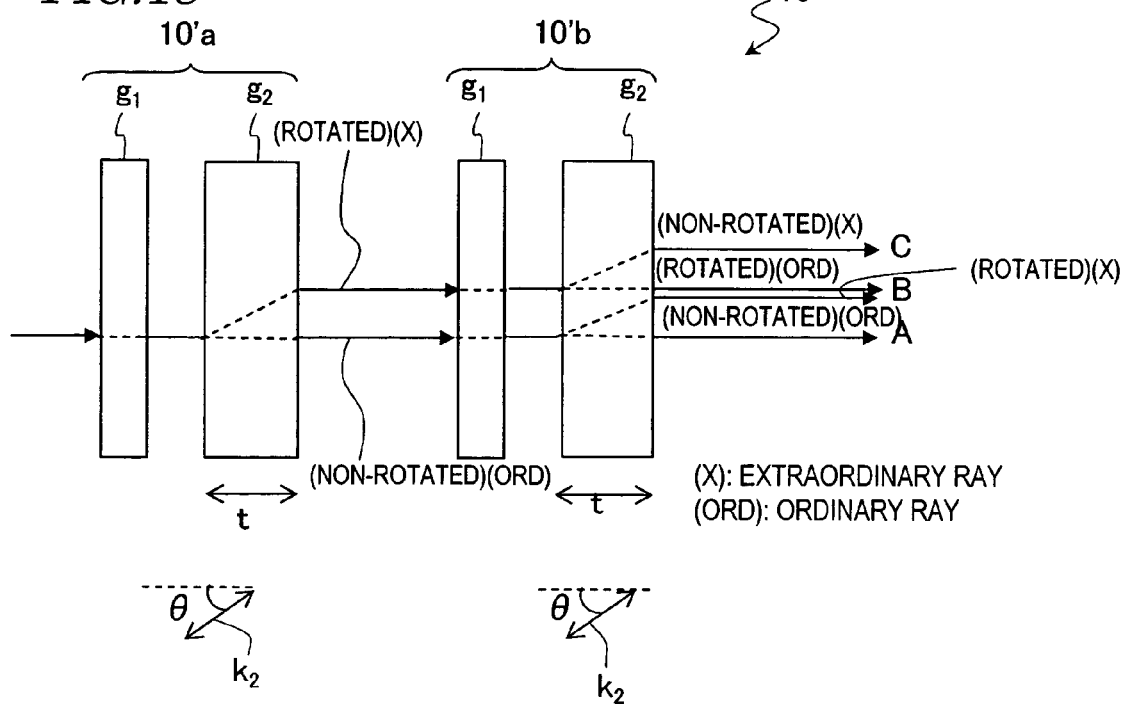
FIG. 18 is a schematic representation showing an optical shifter according to the second preferred embodiment.

FIG. 18 shows an exemplary optical shifter 10 which can be driven appropriately in view of these considerations. The optical shifter 10 shown in FIG. 18 preferably includes a first optical shifting section 10'a, which includes a quartz plate g2 with a thickness of t and is provided on the light incoming side, and a second optical shifting section 10'b, which includes a quartz plate g2 with the thickness of t and is provided on the light outgoing side. Each of the liquid crystal elements g1 of the first and second optical shifting sections 10'a and 10'b preferably includes two liquid crystal layers as shown in FIG. 16.

Since the quartz plate g2 of the first optical shifting section 10'a is as thick as that of the second optical shifting section 10'b, the magnitude of shift caused by the first optical shifting section 10'a between the optical axes of the incoming and outgoing light rays thereof is equal to that of shift caused by the second optical shifting section 10'b between the optical axes of the incoming and outgoing light rays thereof.

In this case, the optic axes k2 of the quartz plates g2 of the first and second optical shifting sections 10'a and 10'b are both located on a plane that is parallel to the paper, and tilt toward the same direction with respect to the optical axis of the incoming light ray. Accordingly, the direction in which the extraordinary ray is refracted by the first optical shifting section 10'a is the same as the direction in which the extraordinary ray is refracted by the second optical shifting section 10'b. Also, the polarization direction of the extraordinary ray transmitted through the first optical shifting section 10'a defines an angle of 90 degrees with that of the ordinary ray transmitted through the first optical shifting section 10'a. Consequently, the condition of shifting this extraordinary ray being transmitted through the second optical shifting section 10'b is opposite to the condition of shifting the ordinary ray being transmitted through the second optical shifting section 10'b. In FIG. 18, the legends (rotated) and (non-rotated) correspond to the rotated and non-rotated states shown in FIGS. 17A through 17D.

Figure 19:
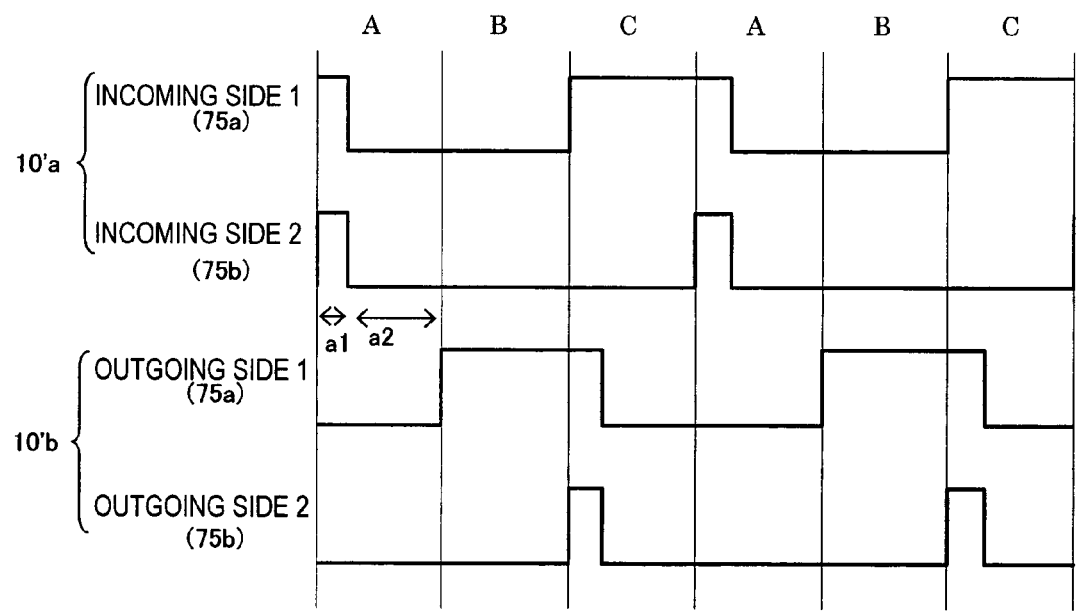
FIG. 19 shows the waveforms of drive voltages applied to drive the optical shifter shown in FIG. 18.

FIG. 19 shows the respective drive voltages to be applied to the first and second liquid crystal layers 75a and 75b of the first optical shifting section 10'a and the first and second liquid crystal layers 75a and 75b of the second optical shifting section 10'b when a display subframe is displayed while being shifted by the optical shifter 10 shown in FIG. 18 in the order of Positions A, B, C, A, B, C and so on.

As shown in FIG. 19, in the period in which the display subframe is displayed at Position A, voltages are applied simultaneously to the first and second liquid crystal layers 75a and 75b of the first optical shifting section 10'a and then stop being applied at the same time. Meanwhile, no voltages are applied to the first and second liquid crystal layers 75a and 75b of the second optical shifting section 10'b. Next, in the period in which the display subframe is displayed at Position B, no voltages are still applied to the first and second liquid crystal layers 75a and 75b of the first optical shifting section 10'a. On the other hand, a voltage is applied to the first liquid crystal layer 75a of the second optical shifting section 10'b but no voltage is still applied to the second liquid crystal layer 75b thereof. Subsequently, in the period in which the display subframe is displayed at Position C, a voltage is applied to the first liquid crystal layer 75a of the first optical shifting section 10'a but no voltage is still applied to the second liquid crystal layer 75b thereof. Meanwhile, voltages are applied simultaneously to the first and second liquid crystal layers 75a and 75b of the second optical shifting section 10'b and then stop being applied at the same time. Such drive voltages are generated by the driver 15 and then repeatedly applied to the liquid crystal elements g1 of the first and second optical shifting sections 10'a and 10'b.

In each of the first and second optical shifting sections 10'a and 10'b, when the first and second liquid crystal layers 75a and 75b thereof are both ON or OFF, the incoming light ray does not have its polarization direction changed (i.e., non-rotated). On the other hand, if one of the first and second liquid crystal layers 75a and 75b is ON and the other liquid crystal layer is OFF, then the incoming light ray has its polarization direction rotated 90 degrees. Accordingly, to shift the incoming light ray to Position B, for example, the first and second liquid crystal layers 75a and 75b of the first optical shifting section 10'a are both turned OFF such that the incoming light ray is kept horizontally polarized and becomes an ordinary ray for the quartz plate g2. Thereafter, in the second optical shifting section 10'b, the first and second liquid crystal layers 75a and 75b thereof are turned ON and OFF, respectively, thereby rotating the polarization direction of the incoming light ray 90 degrees and supplying it as an extraordinary ray to the quartz plate g2.

In this preferred embodiment, while the incoming light ray is being shifted to Position A (i.e., during the period in which Position A is going to be selected), the voltages being applied to the two liquid crystal layers of the first optical shifting section 10'a are changed as shown in FIG. 19. In the same way, while the incoming light ray is being shifted to Position C, the voltages being applied to the two liquid crystal layers of the second optical shifting section 10'b are also changed 's shown in FIG. 19. The reasons are as follows.

Figure 17:
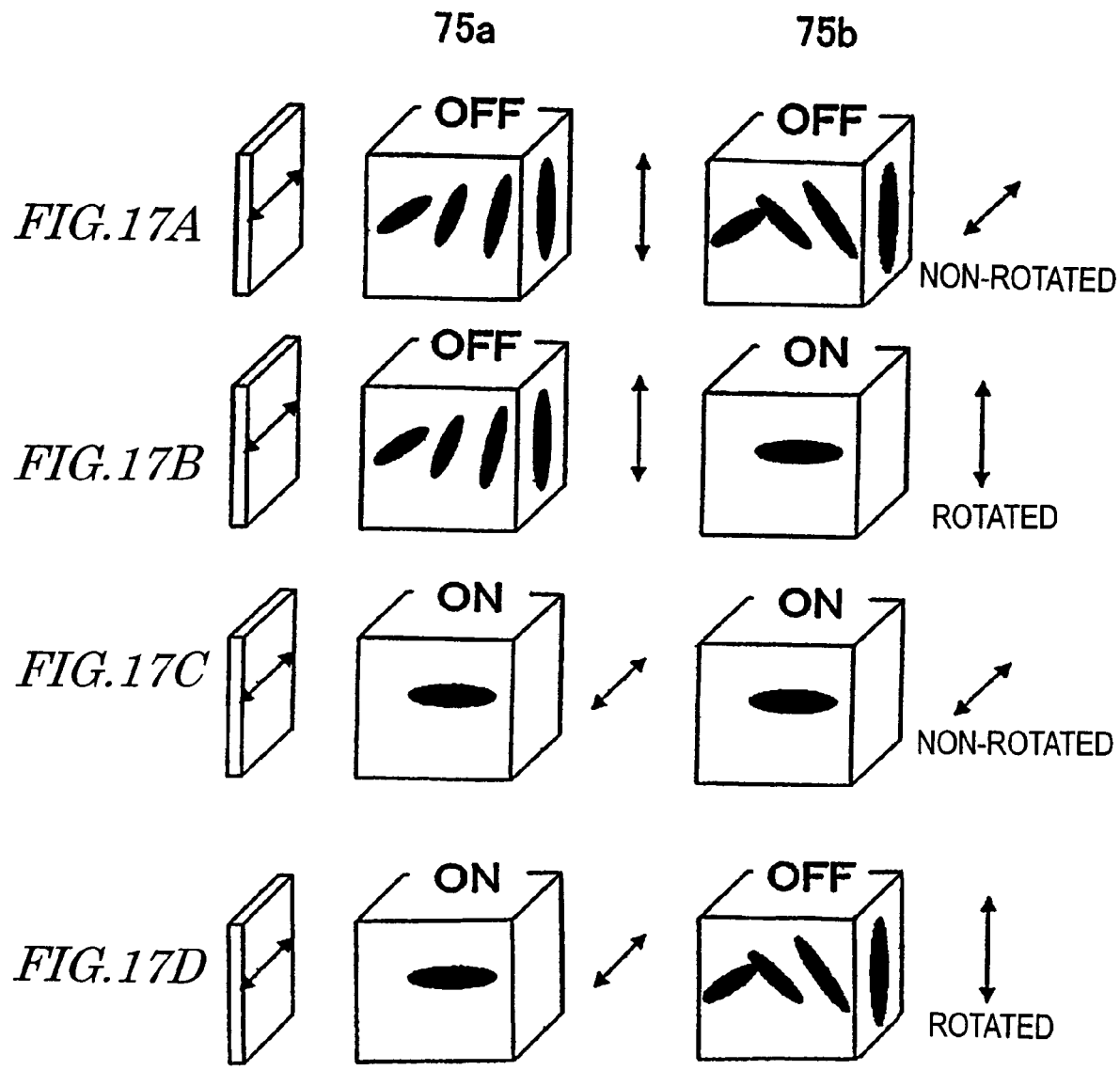
FIGS. 17A through 17D show how the two liquid crystal layers change their states with the voltages applied thereto.

As shown in FIG. 18, to select Position A, the first and second optical shifting sections 10'a and 10'b need to transmit the incoming light ray without rotating it. To achieve this purpose, the first and second liquid crystal layers 75a and 75b of each of the first and second optical shifting sections 10'a and 10'b may be both ON or OFF as shown in FIG. 17.

In the period that precedes the period in which Position A is selected, Position C is selected as shown in FIG. 19. Accordingly, after the Position C selecting period is over and while Position A is going to be selected, the first and second liquid crystal layers 75a and 75b of the first optical shifting section 10'a may be both turned ON. This transition is achieved by maintaining the first liquid crystal layer 75a in the ON state and by switching the second liquid crystal layer 75b from OFF into ON. Thus, the response speed should be fast. In that case, however, the OFF-state interval of the first liquid crystal layer 75a of the first optical shifting section 10'a that has switched from ON into OFF has a length of one subframe, thus possibly causing the problem described above.

Position A may also be selected by turning both of the first and second liquid crystal layers 75a and 75b of the first optical shifting section 10'a OFF after the Position C selecting period is over and while the Position A selecting period lasts. However, the response speed should be low in that case, because this transition is achieved by switching the first liquid crystal layer 75a from ON into OFF and maintaining the second liquid crystal layer 75 in the OFF state.

In view of these considerations, in this preferred embodiment, after the Position C selecting period is over, the first and second liquid crystal layers 75a and 75b of the first optical shifting section 10'a are both turned ON during the initial short interval a1 of the Position A selecting period as shown in FIG. 19. This transition is achieved by maintaining the first liquid crystal layer 75a in the ON state and switching the second liquid crystal layer 75b from OFF into ON. Thus, the response speed should be fast. The interval a1 needs to be long enough to turn the OFF-state second liquid crystal layer 75b ON completely. For example, the interval a1 may have a length of about 0.8 ms to about 3.0 ms.

Thereafter, in the remaining interval a2, the first and second liquid crystal layers 75a and 75b are both turned OFF. This transition is achieved by turning both of the ON-state first and second liquid crystal layers 75a and 75b OFF simultaneously. This is the ON-to-OFF transition described above. However, the low response speed does not bring about any serious problem because the polarization state remains the same before and after the transition. In addition, since the two liquid crystal layers have mutually opposite optical rotatory properties, the quality of the image never deteriorates during the transition. Furthermore, according to such a driving method, the OFF-state interval of each of these two liquid crystal layers, i.e., after the liquid crystal layer was switched from ON into OFF and before the liquid crystal layer is turned ON next time, can be longer than one subframe period.

As can be seen from FIG. 19, according to this driving method, neither of the first and second liquid crystal layers 75a and 75b switches from ON into OFF independently. That is to say, the first and second liquid crystal layers 75a and 75b are always turned OFF simultaneously. Thus, shifting to a different position can be done in a sufficiently short time.

Thus, according to this preferred embodiment, the display subframe can be shifted just as intended and a high-resolution image of quality can be displayed without deteriorating the quality of the projected image due to a decrease in resolution or the appearance of a periodic dotted pattern on the projection plane.

EMBODIMENT 3

Figure 20:
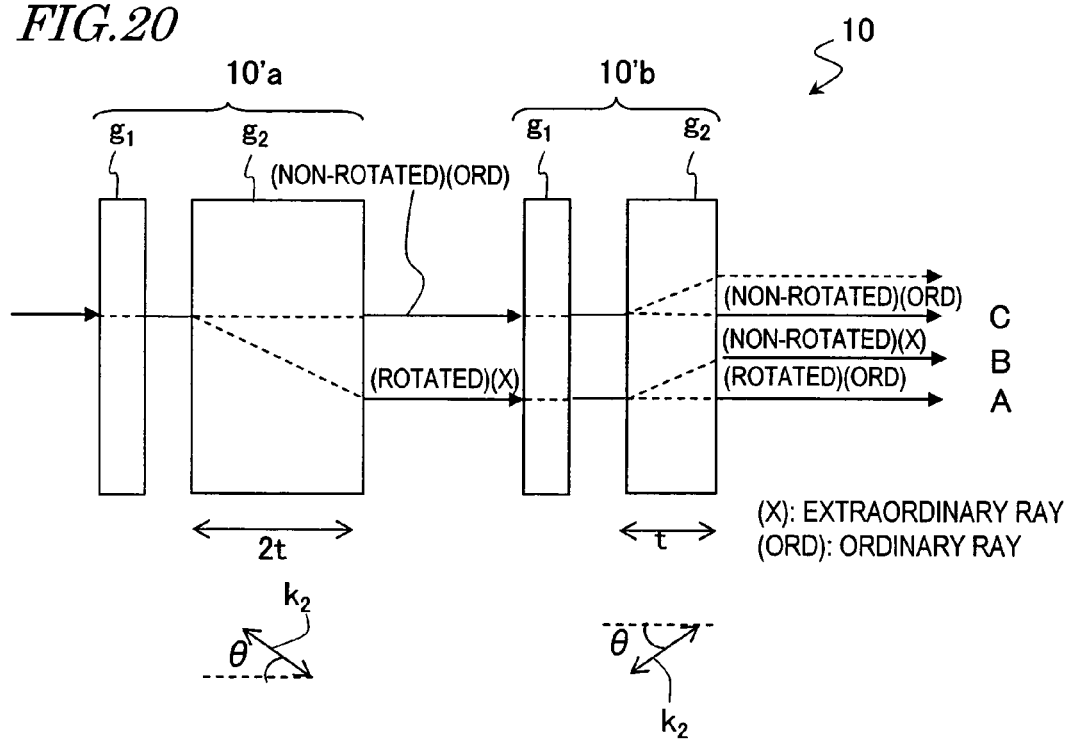
FIG. 20 is a schematic representation showing an optical shifter according to a third specific preferred embodiment of the present invention.

Hereinafter, a third specific preferred embodiment of the present invention will be described. As in the second preferred embodiment described above, each of the two optical shifting sections 10' of the optical shifter 10 of this third preferred embodiment includes a liquid crystal element g1 with two liquid crystal layers. As shown in FIG. 20, the optical shifter 10 of the third preferred embodiment is different from the counterpart of the second preferred embodiment described above in that the quartz plate g2 of the first optical shifting section 10'a has a thickness of 2 t. Also, the optic axes k2 of the quartz plates g2 of the first and second optical shifting sections 10'a and 10'b are both located on a plane that is parallel to the paper, but tilt toward mutually opposite directions with respect to the optical axis of the incoming light ray. Accordingly, the direction in which the extraordinary ray is refracted by the first optical shifting section 10'a is opposite to the direction in which the extraordinary ray is refracted by the second optical shifting section 10'b.

Figure 21:
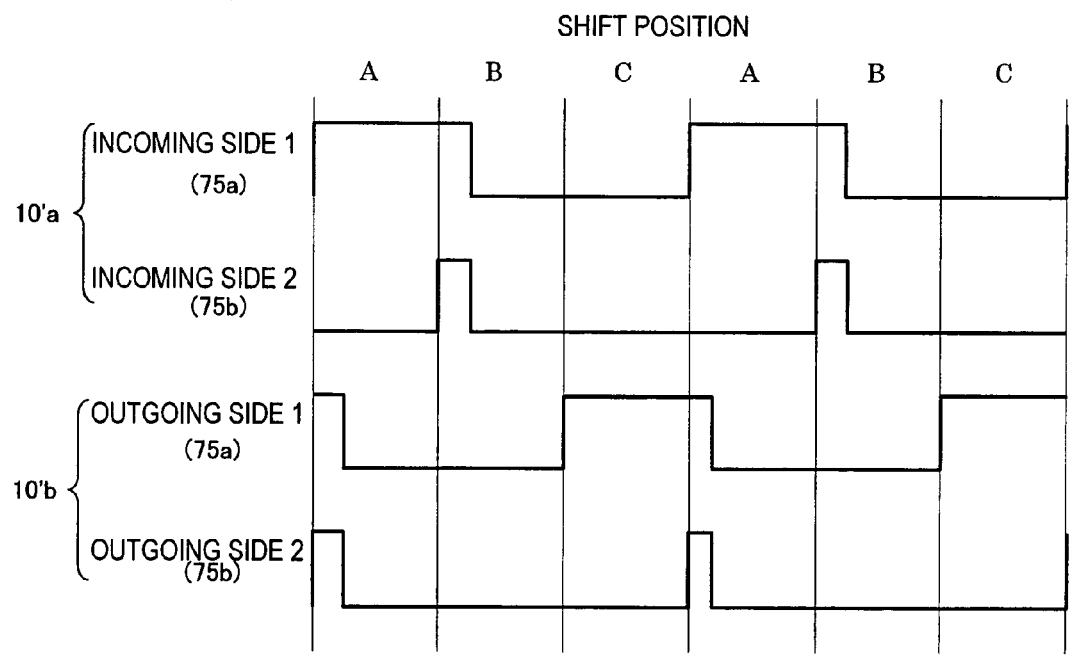
FIG. 21 shows the waveforms of drive voltages applied to drive the optical shifter shown in FIG. 20.

FIG. 21 shows the respective drive voltages to be applied to the first and second liquid crystal layers 75a and 75b of the first and second optical shifting section 10'a and 10'b when a display subframe is displayed while being shifted by the optical shifter 10 shown in FIG. 20 in the order of Positions A, B, C, A, B, C and so on.

As can be seen from FIGS. 19 and 21, the waveform of the drive voltages applied in the periods of selecting Positions A, B and C as shown in FIG. 21 is identical to that of the drive voltages applied in the periods of selecting Positions C, A and B as shown in FIG. 19. Also, as is clear from FIG. 21, each of the four liquid crystal layers has an OFF-state interval (i.e., the interval after the liquid crystal layer has been turned OFF and until the liquid crystal layer is turned ON next time) that is longer than one subframe period. Furthermore, neither of the first and second liquid crystal layers 75a and 75b switches from ON into OFF independently. That is to say, the first and second liquid crystal layers 75a and 75b are always turned OFF simultaneously. Thus, shifting to a different position can be done in a sufficiently short time.

Thus, according to this preferred embodiment, the display subframe can be shifted just as intended and a high-resolution image of quality can be displayed without deteriorating the quality of the projected image due to a decrease in resolution or the appearance of a periodic dotted pattern on the projection plane.

Figure 22:
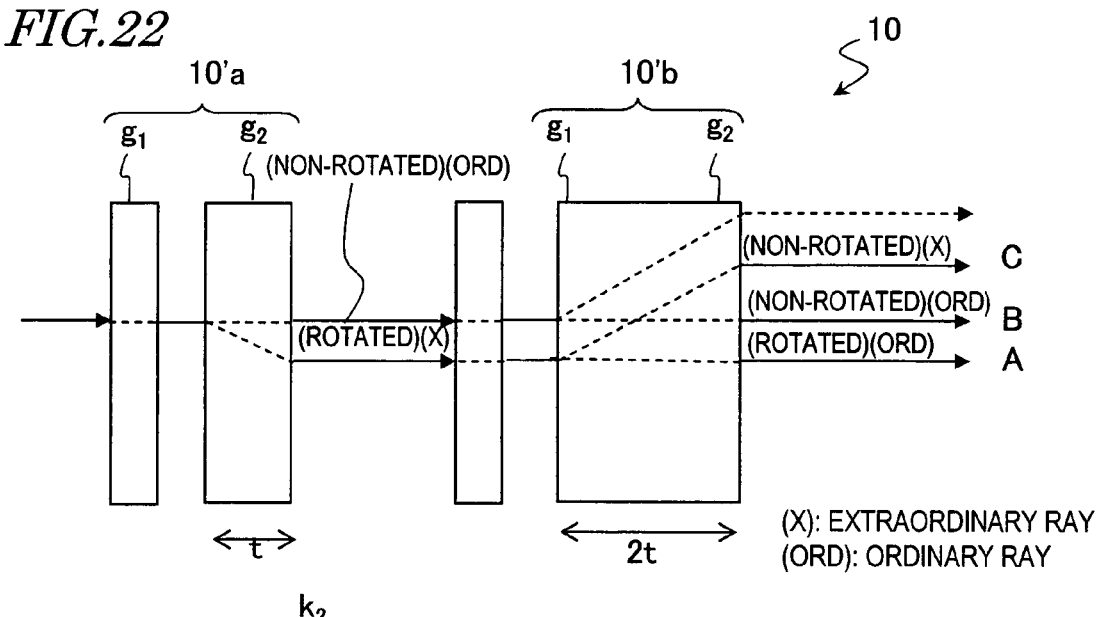
FIG. 22 is a schematic representation showing another optical shifter according to the third preferred embodiment.

FIG. 22 shows another optical shifter 10 according to this preferred embodiment. In the optical shifter 10 shown in FIG. 20, the second optical shifting section 10'b thereof includes a quartz plate g2 with a thickness of 2 t. Also, the optic axes k2 of the quartz plates g2 of the first and second optical shifting sections 10'a and 10'b are both located on a plane that is parallel to the paper, but tilt toward mutually opposite directions with respect to the optical axis of the incoming light ray.

Figure 23:
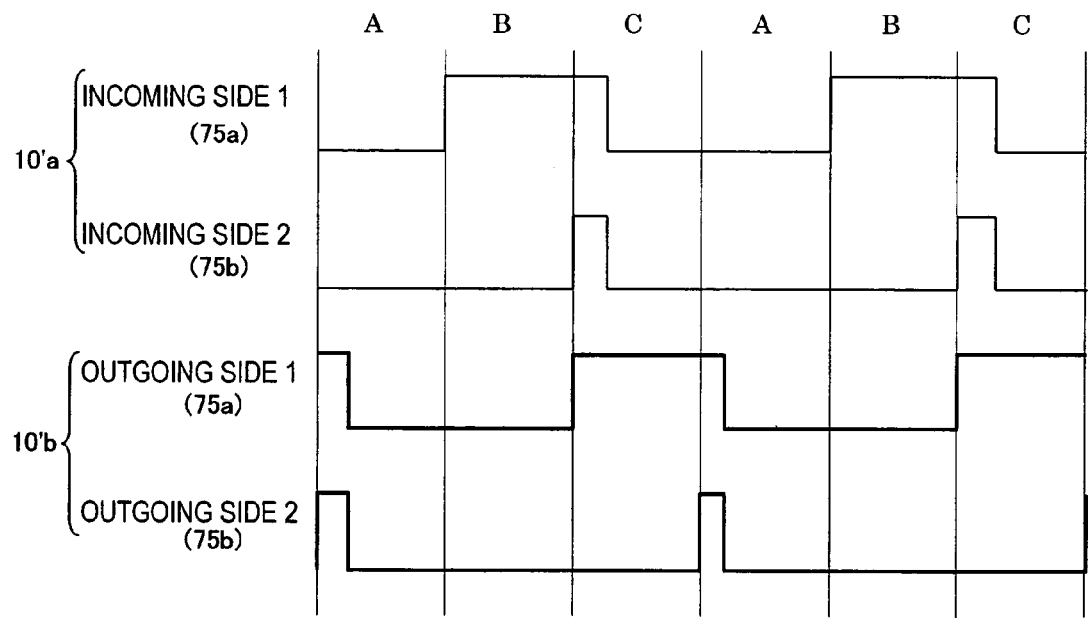
FIG. 23 shows the waveforms of drive voltages applied to drive the optical shifter shown in FIG. 22.

FIG. 23 shows the respective drive voltages to be applied to the first and second liquid crystal layers 75a and 75b of the first and second optical shifting section 10'a and 10'b when a display subframe is displayed while being shifted by the optical shifter 10 shown in FIG. 22 in the order of Positions A, B, C, A, B, C and so on.

In the preferred embodiment shown in FIG. 23, the drive voltages applied to the first and second optical shifting sections 10'a and lo'b in the preferred embodiment shown in FIG. 19 exchange their targets with each other, i.e., applied to the second and first optical shifting sections 10'b and 10'a, respectively. Also, as is clear from FIG. 23, each of the four liquid crystal layers has an OFF-state interval (i.e., the interval after the liquid crystal layer has been turned OFF and until the liquid crystal layer is turned ON next time) that is longer than one subframe period. Furthermore, neither of the first and second liquid crystal layers 75a and 75b switches from ON into OFF independently. That is to say, the first and second liquid crystal layers 75a and 75b are always turned OFF simultaneously. Thus, shifting to a different position can be done in a sufficiently short time.

Consequently, according to this preferred embodiment, the display subframe can be shifted just as intended and a high-resolution image of quality can be displayed without deteriorating the quality of the projected image due to a decrease in resolution or the appearance of a periodic dotted pattern on the projection plane.

EMBODIMENT 4

Figure 24:
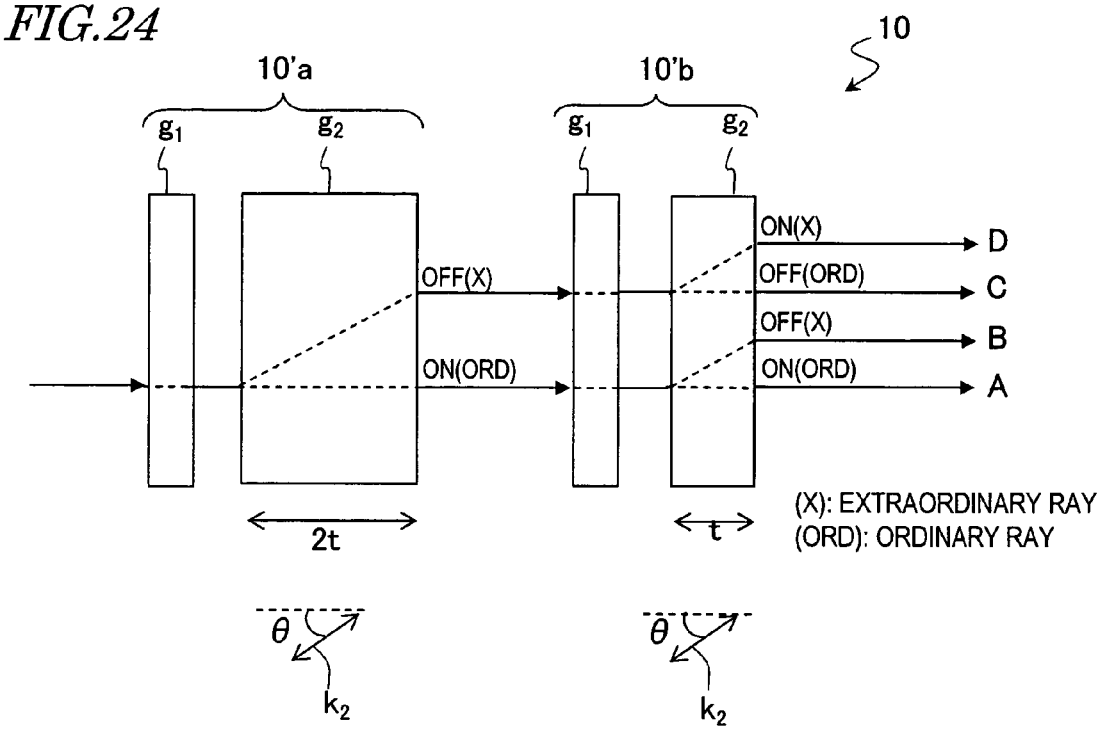
FIG. 24 is a schematic representation showing an optical shifter according to a fourth specific preferred embodiment of the present invention.

Hereinafter, a fourth specific preferred embodiment of the present invention will be described. As shown in FIG. 24, the optical shifter 10 of this fourth preferred embodiment has the same configuration as the counterpart of the first preferred embodiment described above. However, according to the driving method of this preferred embodiment, the incoming light ray is selectively shifted to one of four different positions by using the optical shifter 10 shown in FIG. 24.

In the preferred embodiments described above, three display subframes are generated from each image frame and shifted to positions A, B and C, thereby presenting an image on a projection plane. On the other hand, in this preferred embodiment, four display subframes are generated from each image frame and shifted to positions A, B, C and D, thereby presenting an image on the projection plane. The display subframes Nos. 1, 2 and 3 shown in FIG. 5 and another display subframe No. 4 (not shown) obtained by shifting display subframe No. 1 downward by three pixel pitches may be used as the four display subframes. Specifically, data R4, G5, B6 and so on are preferably stored on the $1^{st}$, $2^{nd}$, $3^{rd}$ rows and so on of display subframe No. 4.

Figure 25:
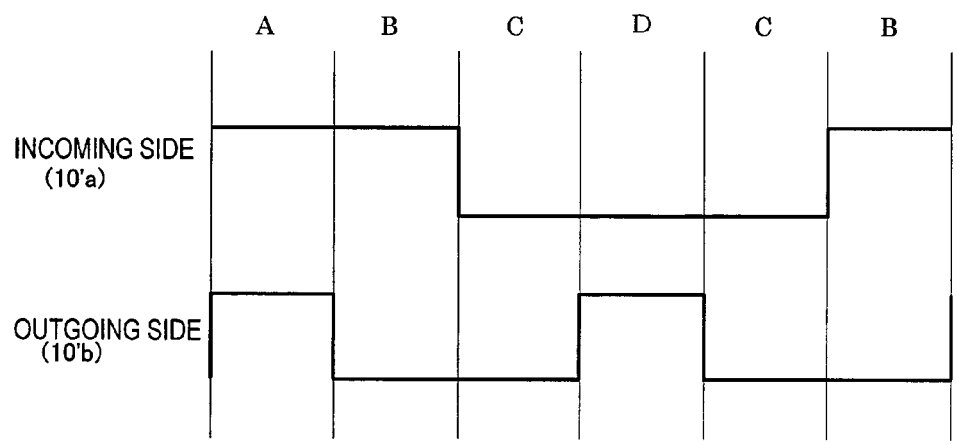
FIG. 25 shows the waveforms of drive voltages applied to drive the optical shifter shown in FIG. 24.

FIG. 25 shows the respective drive voltages to be applied to the liquid crystal elements g1 of the first and second optical shifting sections 10'a and 10'b when a display subframe is displayed while being shifted by the optical shifter 10 shown in FIG. 24 in the order of Positions A, B, C, D, C, B and so on. The drive voltages shown in FIG. 25 are obtained by adding the drive voltages to be applied in the periods of displaying the display subframe at Positions D, C and B to those shown in FIG. 11. Specifically, in the period in which the display subframe is displayed at Position D, no voltage is still applied to the first optical shifting section 10'a but a voltage is applied to the second optical shifting section 10'b. Thereafter, in the periods in which the display subframe is displayed at Positions C and B, the same voltages as those applied in the previous Position C and B selecting periods are applied again.

As shown in FIG. 25, the two drive voltages applied to the liquid crystal elements g1 of the first and second optical shifting sections 10'a and 10'b never change at the same time. Thus, according to this driving method, the display subframe can be shifted just as intended and a high-resolution image of quality can be displayed without deteriorating the quality of the projected image due to a decrease in resolution or the appearance of a periodic dotted pattern on the projection plane.

EMBODIMENT 5

Figure 26:
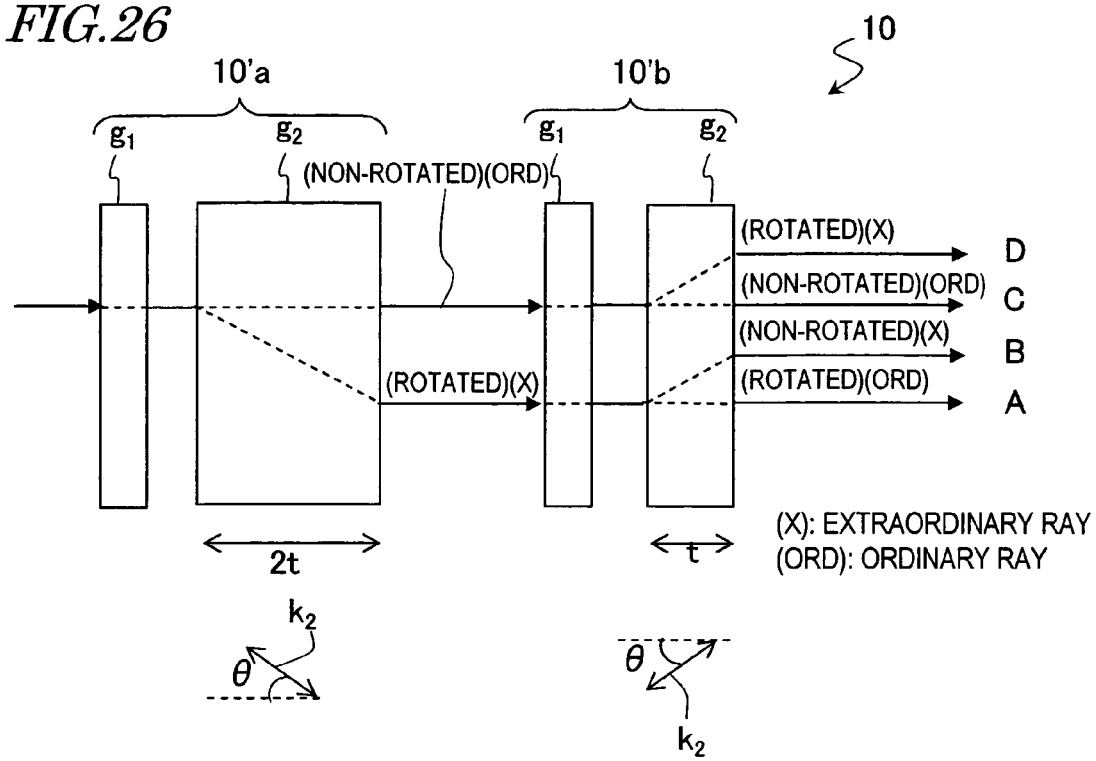
FIG. 26 is a schematic representation showing an optical shifter according to a fifth specific preferred embodiment of the present invention.

Hereinafter, a fifth specific preferred embodiment of the present invention will be described. As shown in FIG. 26, the optical shifter 10 of this fifth preferred embodiment has the same configuration as the counterpart of the third preferred embodiment described above. In this fifth preferred embodiment, an image is presented on a projection plane by selectively shifting a display subframe to one of four different positions as in the fourth preferred embodiment described above.

Figure 27:
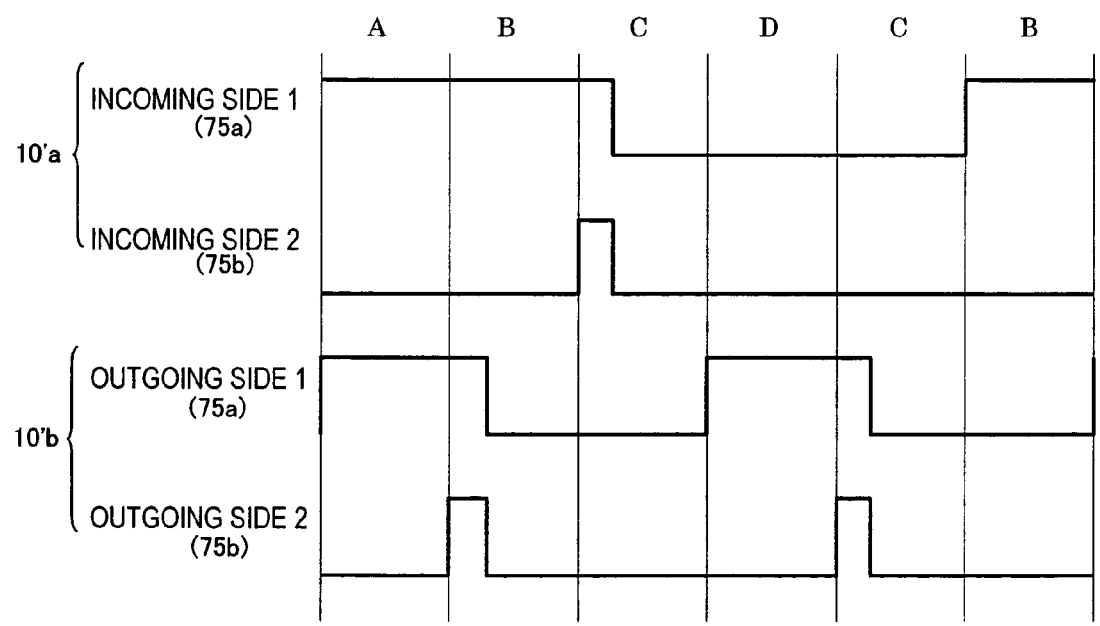
FIG. 27 shows the waveforms of drive voltages applied to drive the optical shifter shown in FIG. 26.
Figure 28:
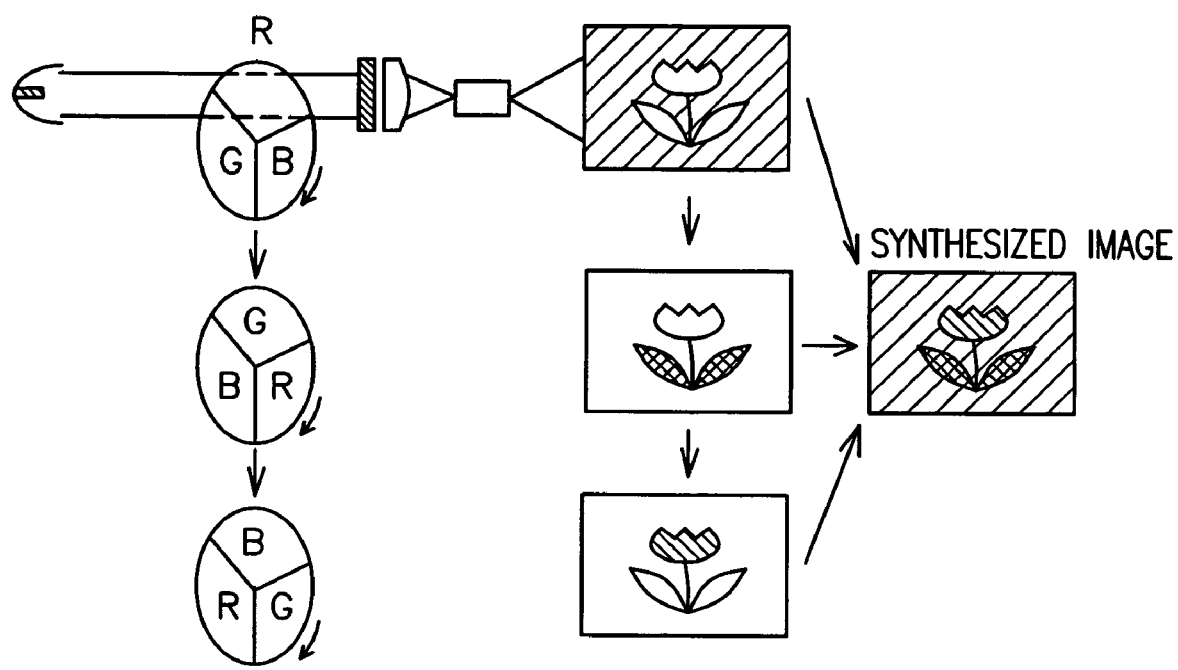
FIG. 28 shows how a conventional field sequential projection type optical display system operates.

FIG. 27 shows the respective drive voltages to be applied to the first and second liquid crystal layers 75a and 75b of the first and second optical shifting section 10'a and 10'b when a display subframe is displayed while being shifted by the optical shifter 10 shown in FIG. 26 in the order of Positions A, B, C, D, C, B and so on.

As shown in FIG. 27, the drive voltages applied to the first and second liquid crystal layers 75a and 75b of the second optical shifting section 10'b in the periods of displaying the display subframe at Positions A, B and C, or Positions D, C and B are the same as those applied in the periods of displaying the display subframe at Positions C, A and B in the preferred embodiment shown in FIG. 23.

In the first optical shifting section 10'a on the other hand, a voltage is applied to the first liquid crystal layer 75a but no voltage is applied to the second liquid crystal layer 75b in the periods of displaying the display subframe at Positions A and B. Next, in the period of displaying the display subframe at Position C, voltages are simultaneously applied to the first and second liquid crystal layers 75a and 75b of the first optical shifting section 10'a and then stopped at the same time. Thereafter, in the periods of displaying the display subframe at Positions D and C, no voltages are applied to the first and second liquid crystal layers 75a and 75b. Subsequently, in the period of displaying the display subframe at Position B, a voltage is applied to the first liquid crystal layer 75a but no voltage is applied to the second liquid crystal layer 75b. In this manner, according to this preferred embodiment, one cycle includes two periods in which the display subframe is displayed at Position B and two periods in which the display subframe is displayed at Position C. However, the drive voltages applied to the first and second optical shifting sections 10'a and 10'b during the first period of displaying the display subframe at Position B or C are different from those applied to the first and second optical shifting sections 10'a and 10'b during the second period of displaying the display subframe at the same position.

Also, as is clear from FIG. 27, each of the four liquid crystal layers has an OFF-state interval (i.e., the interval after the liquid crystal layer has been turned OFF and until the liquid crystal layer is turned ON next time) that is longer than one subframe period. Furthermore, neither of the first and second liquid crystal layers 75a and 75b switches from ON into OFF independently. That is to say, the first and second liquid crystal layers 75a and 75b are always turned OFF simultaneously. Thus, shifting to a different position can be done in a sufficiently short time.

Thus, according to this preferred embodiment, the display subframe can be shifted just as intended and a high-resolution image of quality can be displayed without deteriorating the quality of the projected image due to a decrease in resolution or the appearance of a periodic dotted pattern on the projection plane.

In the foregoing description, preferred embodiments of the present invention have been described as being applied to a projection type optical display system in which a liquid crystal element is used as a display panel. However, the present invention is in no way limited to such specific preferred embodiments. For example, the present invention is also applicable for use even in a projection type optical display system in which a non-liquid crystal element (e.g., a digital mirror device (DMD)) is used as a display panel. Also, if the present invention is applied to a direct viewing optical display system such as a head mounted display, then the retinas of the human eyes function as the projection plane.

Furthermore, the optical shifter according to any of various preferred embodiments of the present invention is also applicable for use in not just projection type optical display systems but also any other type of optical display system.

Various preferred embodiments of the present invention described above provide an optical shifter that can shift a display subframe just as intended without deteriorating the quality of the projected image due to a decrease in resolution or the appearance of a periodic dotted pattern on the projection plane, and also provide a projection type optical display system that can project a high-resolution image of quality by using such an optical shifter.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical shifter, comprising: a first optical shifting section and a second optical shifting section, each of which is able to transmit an incoming light ray after having shifted the optical axis thereof, the first and second optical shifting sections being arranged such that a light ray that has been transmitted through the first optical shifting section enters the second optical shifting section, each of the first and second optical shifting sections comprising:

a liquid crystal element including a liquid crystal cell, the liquid crystal cell selectively changing the polarization direction of the incoming light ray in response to a voltage applied thereto; and a birefringent element, which receives the light ray that has been transmitted through the liquid crystal element and which exhibits one of multiple different refractive indices according to the polarization direction of the incoming light ray, wherein the magnitude of shift caused by the first optical shifting section between the optical axes of the incoming and outgoing light rays thereof is substantially twice greater than that of shift caused by the second optical shifting section between the optical axes of the incoming and outgoing light rays thereof.

2. The optical shifter of claim 1, wherein the optic axis of the birefringent element included in the first optical shifting section is parallel to that of the birefringent element included in the second optical shifting section.

3. The optical shifter of claim 2, wherein the optical axis of the outgoing light ray of the second optical shifting section is defined by one of first, second, third and fourth positions according to a combination of voltages to be applied to the liquid crystal elements of the first and second optical shifting sections, the first position being aligned with the optical axis of the incoming light ray of the first optical shifting section, the second position having been shifted by a predetermined distance from the optical axis of the incoming light ray of the first optical shifting section, the third position having been shifted by twice said predetermined distance from the optical axis of the incoming light ray of the first optical shifting section, the fourth position having been shifted by three times said predetermined distance from the optical axis of the incoming light ray of the first optical shifting section.

4. The optical shifter of claim 3, wherein the liquid crystal cell is a TN mode liquid crystal cell exhibiting positive dielectric anisotropy and wherein the birefringent element is a quartz plate of uniaxial crystals.

5. A method for driving the optical shifter of claim 4, wherein the optical axis of the outgoing light ray of the second optical shifting section repeatedly shifts from one of the first, second, third and fourth positions to the next in this order, and wherein the method comprises the step of regulating the voltages to be applied to the liquid crystal cells of the first and second optical shifting sections such that the voltages being applied to the liquid crystal cells of the first and second optical shifting sections are not suspended simultaneously whenever the optical axis of the light ray shifts from one of the four positions to the next.

6. The optical shifter of claim 1, wherein the optical axis of the outgoing light ray of the second optical shifting section is defined by one of first, second and third positions according to a combination of voltages to be applied to the liquid crystal elements of the first and second optical shifting sections, the first position being aligned with the optical axis of the incoming light ray of the first optical shifting section, the second position having been shifted by a predetermined distance from the optical axis of the incoming light ray of the first optical shifting section, the third position having been shifted by twice said predetermined distance from the optical axis of the incoming light ray of the first optical shifting section.

7. The optical shifter of claim 6, wherein the liquid crystal cell is a TN mode liquid crystal cell exhibiting positive dielectric anisotropy and the birefringent element is a quartz plate of uniaxial crystals.

8. A method for driving the optical shifter of claim 7, wherein the optical axis of the outgoing light ray of the second optical shifting section repeatedly shifts from one of the first, second and third positions to the next in this order, and wherein the method comprises the step of regulating the voltages to be applied to the liquid crystal cells of the first and second optical shifting sections such that the voltages being applied to the liquid crystal cells of the first and second optical shifting sections are not suspended simultaneously whenever the optical axis of the light ray shifts from one of the three positions to the next.

9. A method for driving the optical shifter of claim 7, wherein the optical axis of the outgoing light ray of the second optical shifting section repeatedly shifts in the order of the first, second, third, first, third and second positions, and wherein the method comprises the step of regulating the voltages to be applied to the liquid crystal cells of the first and second optical shifting sections such that the voltages being applied to the liquid crystal cells of the first and second optical shifting sections are suspended simultaneously the smallest number of times when the optical axis of the light ray shifts from one of the three positions to the next.

10. A projection type optical display system comprising:

a light source;

a display panel including multiple pixel regions, each of which is able to modulate light;

a light control system for splitting the light, which has been emitted from the light source, into light rays falling within a number of wavelength ranges and focusing the split light rays onto associated ones of the pixel regions according to the wavelength ranges thereof;

an optical system for forming an image on a projection plane by utilizing the light that has been modulated by the display panel;

a circuit for generating data representing multiple image sub-frames from data representing each image frame as a component of the image and getting the image sub-frames displayed by the display panel time-sequentially; and the optical shifter of claim 1 for shifting, on the projection plane, a selected one of the multiple image sub-frames being displayed by the display panel.

11. An optical shifter, comprising: a first optical shifting section and a second optical shifting section, each of which is able to transmit an incoming light ray after having shifted the optical axis thereof, the first and second optical shifting sections being arranged such that a light ray that has been transmitted through the first optical shifting section enters the second optical shifting section, each of the first and second optical shifting sections comprising:

a liquid crystal element including a first liquid crystal cell and a second liquid crystal cell, each of the first and second liquid crystal cells selectively changing the polarization direction of the incoming light ray in response to a voltage applied thereto; and a birefringent element, which receives the light ray that has been transmitted through the liquid crystal element and which exhibits one of multiple different refractive indices according to the polarization direction of the incoming light ray, wherein the magnitude of shift caused by the first optical shifting section between the optical axes of the incoming and outgoing light rays thereof is substantially equal to that of shift caused by the second optical shifting section between the optical axes of the incoming and outgoing light rays thereof, and wherein the optic axis of the birefringent element included in the first optical shifting section is parallel to that of the birefringent element included in the second optical shifting section.

12. The optical shifter of claim 11, wherein the optical axis of the outgoing light ray of the second optical shifting section is defined by one of first, second and third positions according to a combination of voltages to be applied to the liquid crystal elements of the first and second optical shifting sections, the first position being aligned with the optical axis of the incoming light ray of the first optical shifting section, the second position having been shifted by a predetermined distance from the optical axis of the incoming light ray of the first optical shifting section, the third position having been shifted by twice said predetermined distance from the optical axis of the incoming light ray of the first optical shifting section.

13. The optical shifter of claim 12, wherein the first and second liquid crystal cells are TN mode liquid crystal cells, exhibiting a positive dielectric anisotropy and having opposite optical rotary directions, and are arranged such that directors cross each other at right angles on a pair of planes of the first and second liquid crystal cells that are opposed to each other, and wherein the birefringent element is a quartz plate of uniaxial crystals.

14. A method for driving the optical shifter of claim 13, wherein the optical axis of the outgoing light ray of the second optical shifting section repeatedly shifts from one of the first, second and third positions to the next in this order, and wherein the method comprises the step of regulating the voltages to be applied to the first and second liquid crystal cells of the first and second optical shifting sections such that a period of time in which no voltages are applied to the first or second liquid crystal cells of the first and second optical shifting sections is longer than a period of time in which one of the three positions is being selected.

15. A projection type optical display system comprising:
a light source;
a display panel including multiple pixel regions, each of which is able to modulate light;
a light control system for splitting the light, which has been emitted from the light source, into light rays falling within a number of wavelength ranges and focusing the split light rays onto associated ones of the pixel regions according to the wavelength ranges thereof;
an optical system for forming an image on a projection plane by utilizing the light that has been modulated by the display panel;
a circuit for generating data representing multiple image sub-frames from data representing each image frame as a component of the image and getting the image sub-frames displayed by the display panel time-sequentially; and
the optical shifter of claim 11 for shifting, on the projection plane, a selected one of the multiple image sub-frames being displayed by the display panel.

16. The optical shifter of claim 11, wherein the first liquid crystal cell and the second liquid crystal cell include a first liquid crystal layer and a second liquid crystal layer, respectively, and the first liquid crystal layer and the second liquid crystal layer are made of TN mode liquid crystal materials with mutually opposite optical rotatory directions.

17. An optical shifter, comprising: a first optical shifting section and a second optical shifting section, each of which is able to transmit an incoming light ray after having shifted the optical axis thereof, the first and second optical shifting sections being arranged such that a light ray that has been transmitted through the first optical shifting section enters the second optical shifting section, each of the first and second optical shifting sections comprising:

a liquid crystal element including a first liquid crystal cell and a second liquid crystal cell, each of the first and second liquid crystal cells selectively changing the polarization direction of the incoming light ray in response to a voltage applied thereto; and a birefringent element, which receives the light ray that has been transmitted through the liquid crystal element and which exhibits one of multiple different refractive indices according to the polarization direction of the incoming light ray, wherein the ratio of the magnitude of shift caused by the first optical shifting section between the optical axes of the incoming and outgoing light rays thereof to that of shift caused by the second optical shifting section between the optical axes of the incoming and outgoing light rays thereof is substantially equal to either two to one or one to two, wherein the optic axis of the birefringent element included in the first optical shifting section and that of the birefringent element included in the second optical shifting section are defined on the same plane but are tilted toward mutually opposite directions from the optical axis of the incoming light ray.

18. The optical shifter of claim 17, wherein the magnitude of shift caused by the first optical shifting section between the optical axes of the incoming and outgoing light rays thereof is substantially twice greater than that of shift caused by the second optical shifting section between the optical axes of the incoming and outgoing light rays thereof.

19. The optical shifter of claim 18, wherein the optical axis of the outgoing light ray of the second optical shifting section is defined by one of first, second, third arid fourth positions according to a combination of voltages to be applied to the liquid crystal elements of the first and second optical shifting sections, the first position being aligned with the optical axis of the incoming light ray of the first optical shifting section, the second position having been shifted by a predetermined distance from the optical axis of the incoming light ray of the first optical shifting section, the third position having been shifted by twice said predetermined distance from the optical axis of the incoming light ray of the first optical shifting section, the fourth position having been shifted by three times said predetermined distance from the optical axis of the incoming light ray of the first optical shifting section.

20. The optical shifter of claim 19, wherein the first and second liquid crystal cells are TN mode liquid crystal cells, exhibiting a positive dielectric anisotropy and having opposite optical rotary directions, and are arranged such that directors cross each other at right angles on a pair of planes of the first and second liquid crystal cells that are opposed to each other, and wherein the birefringent element is a quartz plate of uniaxial crystals.

21. A method for driving the optical shifter of claim 20, wherein the optical axis of the outgoing light ray of the second optical shifting section repeatedly shifts from one of the first, second and third positions to the next in this order, and wherein the method comprises the step of regulating the voltages to be applied to the first and second liquid crystal cells of the first and second optical shifting sections such that a period of time in which no voltages are applied to the first or second liquid crystal cells of the first and second optical shifting sections is longer than a period of time in which one of the three positions is being selected.

22. The optical shifter of claim 17, wherein the optical axis of the outgoing light ray of the second optical shifting section is defined by one of first, second and third positions according to a combination of voltages to be applied to the liquid crystal elements of the first and second optical shifting sections, the first position being aligned with the optical axis of the incoming light ray of the first optical shifting section, the second position having been shifted by a predetermined distance from the optical axis of the incoming light ray of the first optical shifting section, the third position having been shifted by twice said predetermined distance from the optical axis of the incoming light ray of the first optical shifting section.

23. The optical shifter of claim 22, wherein the first and second liquid crystal cells are TN mode liquid crystal cells, exhibiting a positive dielectric anisotropy and having opposite optical rotary directions, and are arranged such that directors cross each other at right angles on a pair of planes of the first and second liquid crystal cells that are opposed to each other, and wherein the birefringent element is a quartz plate of uniaxial crystals.

24. A projection type optical display system comprising:

a light source;

a display panel including multiple pixel regions, each of which is able to modulate light;

a light control system for splitting the light, which has been emitted from the light source, into light rays falling within a number of wavelength ranges and focusing the split light rays onto associated ones of the pixel regions according to the wavelength ranges thereof;

an optical system for forming an image on a projection plane by utilizing the light that has been modulated by the display panel;

a circuit for generating data representing multiple image sub-frames from data representing each image frame as a component of the image and getting the image sub-frames displayed by the display panel time-sequentially; and the optical shifter of claim 17 for shifting, on the projection plane, a selected one of the multiple image sub-frames being displayed by the display panel.

* * * * *